US010919392B2

(12) United States Patent
Shibasaki et al.

(10) Patent No.: US 10,919,392 B2
(45) Date of Patent: Feb. 16, 2021

(54) ONBOARD SYSTEM AND TRANSPORT VEHICLE MAINTENANCE METHOD

(71) Applicant: Mitsubishi Electric Corporation, Tokyo (JP)

(72) Inventors: Tokiko Shibasaki, Tokyo (JP); Shogo Tatsumi, Tokyo (JP); Koki Yoshimoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 118 days.

(21) Appl. No.: 16/311,039

(22) PCT Filed: Jun. 24, 2016

(86) PCT No.: PCT/JP2016/068761
§ 371 (c)(1),
(2) Date: Dec. 18, 2018

(87) PCT Pub. No.: WO2017/221391
PCT Pub. Date: Dec. 28, 2017

(65) Prior Publication Data
US 2019/0176859 A1 Jun. 13, 2019

(51) Int. Cl.
B60L 3/00 (2019.01)
B61L 3/00 (2006.01)
(Continued)

(52) U.S. Cl.
CPC .............. B60L 3/00 (2013.01); B61L 3/006 (2013.01); B61L 15/0063 (2013.01);
(Continued)

(58) Field of Classification Search
CPC ........ B60L 3/00; B61L 3/006; B61L 15/0063; B61L 15/0072; B61L 15/0081; G07C 5/008
See application file for complete search history.

(56) References Cited

U.S. PATENT DOCUMENTS 5,977,742 A 11/1999 Henmi
6,434,458 B1 * 8/2002 Laguer-Diaz ........... B61L 3/125
701/31.4
(Continued)

FOREIGN PATENT DOCUMENTS

EP 2 792 573 A2 10/2014
JP 01-214202 A 8/1989
(Continued)

OTHER PUBLICATIONS

International Search Report (PCT/ISA/210) dated Aug. 30, 2016, by the Japan Patent Office as the International Searching Authority for International Application No. PCT/JP2016/068761.
(Continued)

Primary Examiner — Michael J Zanelli
(74) Attorney, Agent, or Firm — Buchanan Ingersoll & Rooney PC

(57) ABSTRACT

An onboard system includes two control parts. Each of the two control parts has the function of performing a first process for controlling the travel of the transport vehicle. In a period during which a first control part being one control part out of the two control parts is performing the first process, a second control part being other control part out of the two control parts does not perform the first process. In the period during which the first control part is performing the first process, the second control part performs a maintenance process for performing maintenance of the transport vehicle.

11 Claims, 17 Drawing Sheets

(51) Int. Cl.
*B61L 15/00* (2006.01)
*G07C 5/00* (2006.01)

(52) U.S. Cl.
CPC ....... *B61L 15/0072* (2013.01); *B61L 15/0081* (2013.01); *G07C 5/008* (2013.01)

(56) References Cited

U.S. PATENT DOCUMENTS

| | | | | |
|---|---|---|---|---|
| 6,647,356 | B2* | 11/2003 | Pierro | B61L 27/0083 702/184 |
| 8,761,974 | B2* | 6/2014 | Hawthorne | B60T 13/665 701/20 |
| 2008/0046142 | A1* | 2/2008 | Jordan | H04L 12/40195 701/36 |
| 2016/0297454 | A1* | 10/2016 | Shubs, Jr. | B61L 15/0072 |

FOREIGN PATENT DOCUMENTS

| | | |
|---|---|---|
| JP | 08-51702 A | 2/1996 |
| JP | 11-262102 A | 9/1999 |
| JP | 2003-160036 A | 6/2003 |
| JP | 2011-120385 A | 6/2011 |
| JP | 2012-016990 A | 1/2012 |
| JP | 2014-207792 A | 10/2014 |
| JP | 2014-230353 A | 12/2014 |

OTHER PUBLICATIONS

Written Opinion (PCT/ISA/237) dated Aug. 30, 2016, by the Japan Patent Office as the International Searching Authority for International Application No. PCT/JP2016/068761.

Office Action dated Oct. 7, 2020, issued in corresponding Indian Patent Application No. 201847045717, 5 pages.

* cited by examiner

|  | CONTROL PART 10a | CONTROL PART 10b |
|---|---|---|
| PROCESS MODE A | MVPr | MtPr |
| PROCESS MODE B | MtPr | MVPr |

| TARGET DATA | PERIOD Tn (sec) | CALCULATION METHOD | PRIORITY |
|---|---|---|---|
| StDp | 1 | AVERAGE VALUE | 10 |
| StDt | 10 | MAXIMUM VALUE | 123 |

| NUMBER | LOCATION INFORMATION | | VALUE | PROCESS STATE |
|---|---|---|---|---|
|  | LATITUDE | LONGITUDE | | |
| 1 | 35.20 | 139.44 | 10 | RAW |
| 2 | 35.20 | 138.44 | 12 | RAW |
| 3 | 35.20 | 140.44 | 9 | DONE |

FIG. 9

| | CONTROL PART 10aX | CONTROL PART 10aY | CONTROL PART 10bX | CONTROL PART 10bY |
|---|---|---|---|---|
| PROCESS MODE C | MVPr | BkUp | MtPr | MtPr |
| PROCESS MODE D | BkUp | MVPr | MtPr | MtPr |
| PROCESS MODE E | MtPr | MtPr | MVPr | BkUp |
| PROCESS MODE F | MtPr | MtPr | BkUp | MVPr |

| | CONTROL PART 10aX | CONTROL PART 10aY | CONTROL PART 10bX | CONTROL PART 10bY |
|---|---|---|---|---|
| PROCESS MODE G | MVPr | BkUp | BkUp | MtPr |
| PROCESS MODE H | BkUp | MVPr | BkUp | MtPr |
| PROCESS MODE I | BkUp | BkUp | MVPr | MtPr |
| PROCESS MODE J | MtPr | BkUp | BkUp | MVPr |

F I G. 1 4

TB1C

| | CONTROL PART 10a | CONTROL PART 10b | ATC40Ca | ATC40Cb | MASTER CONTROLLER 50Ca | MASTER CONTROLLER 50Cb |
|---|---|---|---|---|---|---|
| PROCESS MODE K | MVPr | MtPr | AtPr | MtPr | SpPr | MtPr |
| PROCESS MODE L | MtPr | MVPr | MtPr | AtPr | MtPr | SpPr |
| PROCESS MODE M | MVPr | MtPr | MtPr | AtPr | MtPr | SpPr |
| PROCESS MODE N | MtPr | MVPr | AtPr | MtPr | MtPr | SpPr |

FIG. 15

| TARGET DATA | PERIOD Tn (sec) | CALCULATION METHOD | PRIORITY | CONDITION Cd | CONDITION PRIORITY |
|---|---|---|---|---|---|
| StDp | 1 | AVERAGE VALUE | 10 | CONDITION CdB (FAILURE OF BREAK) | 1 |
| StDt | 10 | MAXIMUM VALUE | 123 | CONDITION CdA (FAILURE OF AIR CONDITIONING APPARATUS) | 2 |

TB2D

F I G. 2 0
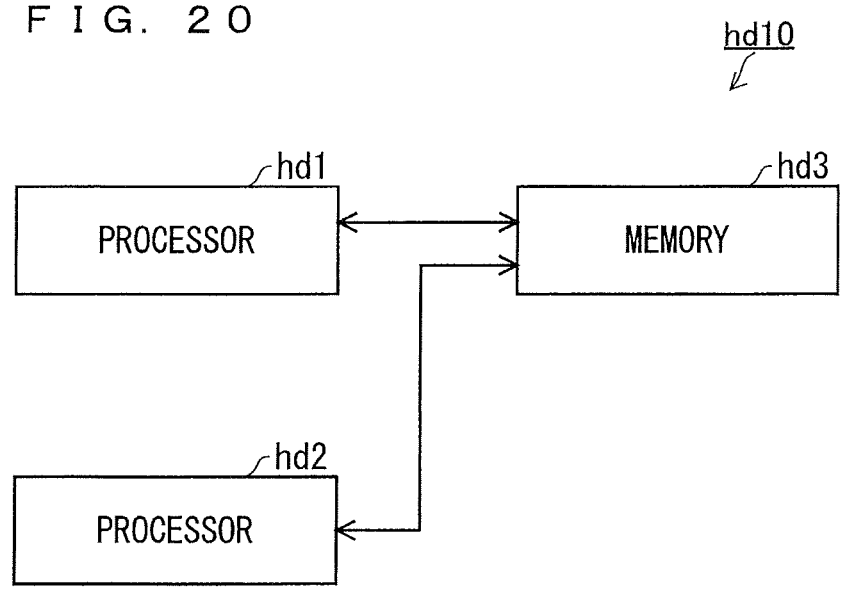

ONBOARD SYSTEM AND TRANSPORT VEHICLE MAINTENANCE METHOD

TECHNICAL FIELD

The present invention relates to an onboard system that controls a transport vehicle for transporting people, and to a transport vehicle maintenance method.

BACKGROUND ART

Recent years, various techniques relating to a transport vehicle such as a train have been developed. For example, Patent Document 1 discloses a technique for extending the operation life of a primary battery used for driving a sensor mounted on a train (hereinafter referred to also as the "related art A").

Specifically, in the related art A, by detecting the temperature and vibrations of a device installed under the floor of a car using a sensor, a failure of the device is detected. Further, in the related art A, in a region not being a critical site, the sensor samples data less frequently.

PRIOR ART DOCUMENTS

Patent Documents

Patent Document 1: Japanese Patent Application Laid-Open No. 2011-120385

SUMMARY

Problem to be Solved by the Invention

A conventional system of a transport vehicle generally includes at least two control parts for performing a process for controlling the travel of the transport vehicle (hereinafter referred to also as the "travel control process"). Normally, in the two control parts, one of the two control parts performs the travel control process, and the other one of the two control parts is on standby. Therefore, the conventional system has a problem that the other control part is not effectively used. The related art A cannot solve the problem.

The present invention has been made to solve such a problem, and an object of the present invention is to provide an onboard system and the like which is capable of effectively use, in the configuration in which a transport vehicle includes two control parts, a control part that is not performing a process for controlling the travel of the transport vehicle.

Means to Solve the Problem

In order to achieve the above-stated object, an onboard system according to an aspect of the present invention is provided at a transport vehicle that is elongated and travels along a previously provided route. The onboard system includes u (where u is a natural number of 4 or greater)-pieces of control parts. Each of the u-pieces of control parts has a function of performing a first process for controlling the travel of the transport vehicle. The u-pieces of control parts include: a main control part being one control part that performs the first process; and three or more control parts excluding the main control part from the u-pieces of control parts. Each of the three or more control parts does not perform the first process in a period during which the main control part is performing the first process. The three or more control parts perform a plurality of types of maintenance processes for performing maintenance of the transport vehicle in a distributed manner in the period during which the main control part is performing the first process.

Effects of the Invention

In the present invention, the onboard system includes u (where u is a natural number of 4 or greater)-pieces of control parts. Each of the u-pieces of control parts has the function of performing the first process for controlling the travel of the transport vehicle. In a period during which the main control being one control part that performs the first process included in the u-pieces of control parts is performing the first process, each of the three or more control parts included in the u-pieces of control parts does not perform the first process. In the period during which the main control part is performing the first process, the three of more control parts perform a plurality of types of maintenance processes for performing maintenance of the transport vehicle in a distributed manner.

Thus, in the configuration in which a transport vehicle includes two control parts, the control part not performing the process for controlling the travel of the transport vehicle can be effectively used.

The objects, characteristics, aspects, and advantages of the present invention will become more apparent from the following detailed description and the accompanying drawings.

BRIEF DESCRIPTION OF DRAWINGS

FIG. 3 shows an exemplary process allocation table according to the first embodiment of the present invention.

FIG. 4 shows an exemplary representative value rule table.

FIG. 5 shows an exemplary state data table.

FIG. 9 shows an exemplary process allocation table according to the second embodiment of the present invention.

FIG. 10 shows other exemplary process allocation table according to the second embodiment of the present invention.

FIG. 14 shows an exemplary process allocation table according to the fourth embodiment of the present invention.

FIG. 15 shows an exemplary representative value rule table according to a fifth embodiment of the present invention.

FIG. 20 is a hardware configuration diagram of the onboard system.

DESCRIPTION OF EMBODIMENTS

Figure 1:
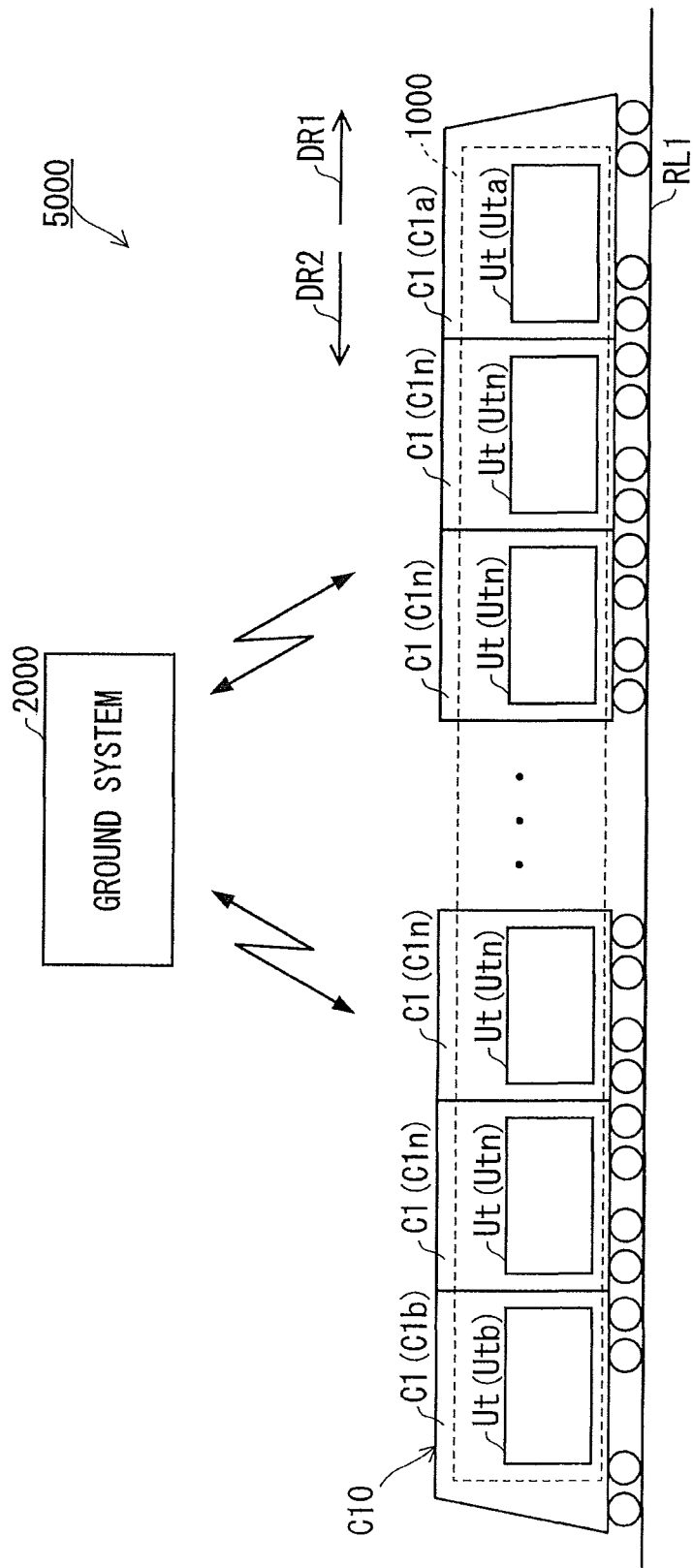
FIG. 1 shows the configuration of a maintenance system according to a first embodiment of the present invention.

In the following, with reference to the drawings, a description will be given of embodiments of the present invention. In the drawings referred to in the following, identical constituents are denoted by an identical reference character. The name and function of those constituents denoted by an identical reference character are the same. Accordingly, a detailed description of part of the constituents denoted by an identical reference character may be omitted.

First Embodiment

FIG. 1 shows the configuration of a maintenance system 5000 according to a first embodiment of the present invention. Note that, for the sake of convenience, FIG. 1 also shows the configuration not included in the maintenance system 5000 (for example, a transport vehicle C10, a route RL1 and the like).

The transport vehicle C10 is a vehicle for transporting people. The transport vehicle C10 is, for example, a train. The shape of the transport vehicle C10 is elongated. The transport vehicle C10 travels along the route RL1 that is previously provided. The transport vehicle C10 normally travels in a direction DR1. Note that, depending on the situation of the transport vehicle C10, the transport vehicle C10 travels in a direction DR2.

The transport vehicle C10 is formed by an m-pieces of cars C1. "m" is a natural number of 2 or greater. The m-pieces of cars C1 are linearly coupled to each other.

Hereinafter, one end of the transport vehicle C10 is referred to also as the "end Eda". Further, hereinafter, the car C1 corresponding to the end Eda of the transport vehicle C10 is referred to also as the "car C1a".

Further, hereinafter, other end of the transport vehicle C10 is referred to also as the "end Edb". Still further, hereinafter, the car C1 corresponding to the end Edb of the transport vehicle C10 is referred to also as the "car C1b". Still further, hereinafter, among the m-pieces of cars C1, a car C1 between the car C1a and the car C1b is referred to also as the "car C1n".

The maintenance system 5000 includes an onboard system 1000 and a ground system 2000. The ground system 2000 is provided on the ground. The onboard system 1000 and the ground system 2000 have the function of communicating with each other via wireless communication.

The onboard system 1000 performs the various processes, which will be described later, on the transport vehicle C10. The onboard system 1000 is provided at the transport vehicle C10. That is, the onboard system 1000 travels according to the travel of the transport vehicle C10.

The onboard system 1000 includes m-pieces of control units Ut. The m-pieces of control units Ut are respectively provided at the m-pieces of cars C1. In other words, the control unit Ut is provided at each of the m-pieces of cars C1.

The m-pieces of control units Ut are configured so as to be capable of communicating with each other via a communication cable (not shown). For example, the m-pieces of control units Ut are daisy-chained by a communication cable. Note that, the m-pieces of control units Ut may be configured so as to be capable of communicating with each other via wireless communication.

Hereinafter, the control unit Ut provided at the car C1a is referred to also as the "control unit Uta". Further, hereinafter, the control unit Ut provided at the car C1b is referred to also as the "control unit Utb". Still further, hereinafter, the control unit Ut provided at the car C1n is referred to also as the "control unit Utn".

Figure 2:
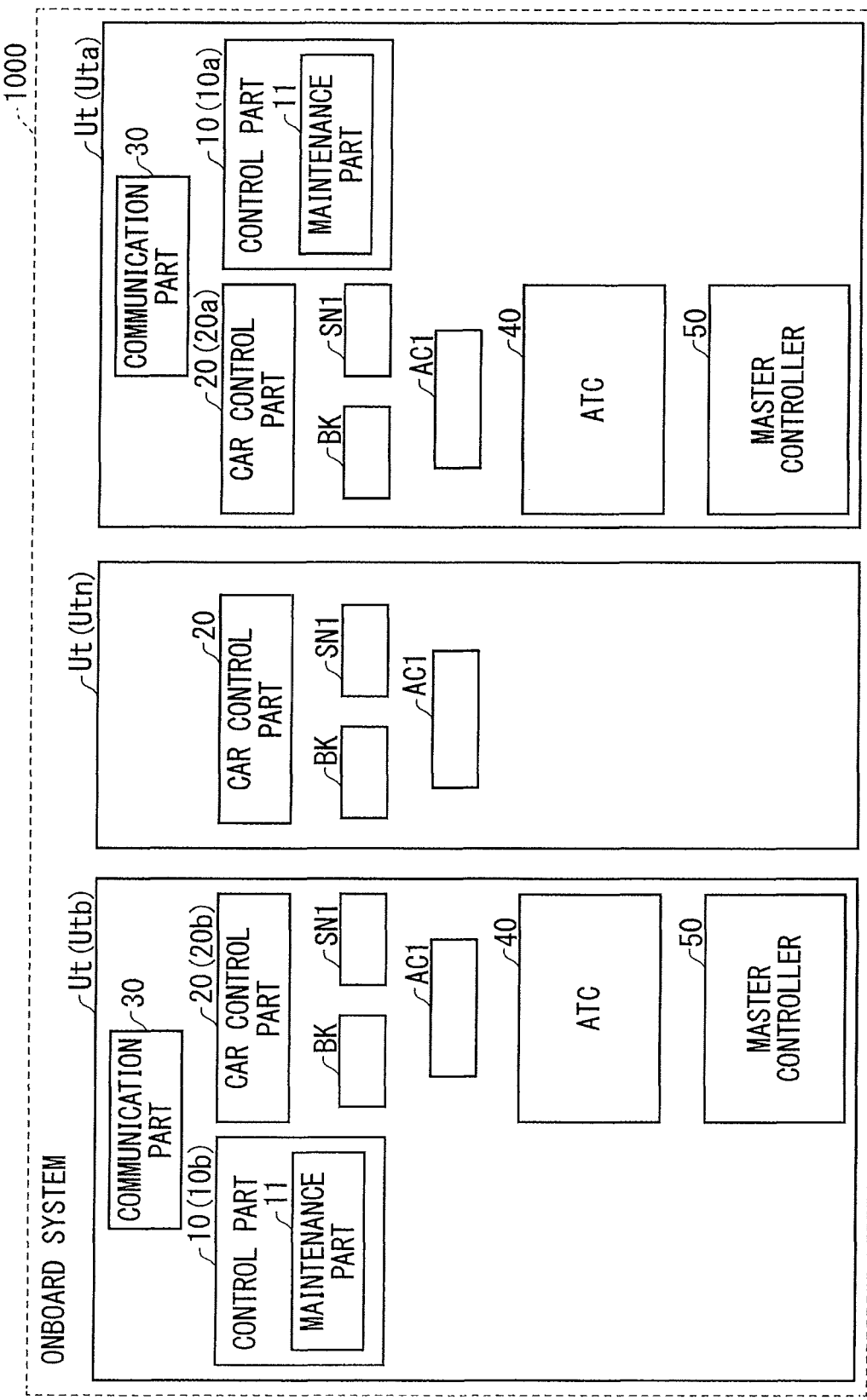
FIG. 2 is a block diagram showing the configuration of an onboard system according to the first embodiment of the present invention.

FIG. 2 is a block diagram showing the configuration of the onboard system 1000 according to the first embodiment of the present invention. Note that, for the sake of easier understanding of the configuration, FIG. 2 shows just three control units Ut. The three control units Ut are the control unit Uta, the control unit Utb, and the control unit Utn.

Firstly, a description will be given of the configuration of the control unit Uta. Hereinafter, a master controller is referred to also as the "master controller". The control unit Uta includes a control part 10, a car control part 20, a communication part 30, a sensor SN1, a brake BK, an air conditioning apparatus AC1, an ATC (Automatic Train Control) 40, and a master controller 50.

Note that, the control unit Uta is provided at the car C1a corresponding to the end Eda of the transport vehicle C10. That is, the control unit Uta is provided at the end Eda of the transport vehicle C10. Accordingly, the control part 10 of the control unit Uta is provided at the end Eda.

The control part 10 has the function of controlling the constituents included in the onboard system 1000. Further, the control part 10 performs various types of processes which will be described later. The control part 10 is, for example, a processor such as a CPU (Central Processing Unit). The control part 10 includes memory (not shown).

The control part 10 has the function of performing a process MVPr for controlling the travel of the transport vehicle C10. The process MVPr includes, for example, a process of exerting control to cause the stopped transport vehicle C10 to travel. The process MVPr includes, for example, a process of exerting control to cause the traveling transport vehicle C10 to stop.

Further, the control part 10 has the function of performing a maintenance process MtPr for performing maintenance of the transport vehicle C10. Details of the maintenance process MtPr will be described later.

The control part 10 includes a maintenance part 11. The maintenance part 11 is, for example, a program module executed by the control part 10. Note that, the maintenance part 11 may be configured by dedicated hardware. The maintenance part 11 has the function of performing the maintenance process MtPr.

Hereinafter, the location where the transport vehicle C10 is positioned is referred to also as the "location Lc". The location Lc is represented in latitude and longitude. Note that, the location Lc is not limited to latitude and longitude. The location Lc may be represented by, for example, the distance from a specific location (for example, the origin station) on the route RL1.

Further, the control part 10 has the function of detecting the location Lc. In detecting the location Lc, a known location measuring method using the GPS (Global Positioning System) or the like is used. Specifically, the control part 10 constantly performs a location detection process. In the location detection process, the control part 10 arbitrarily detects the location Lc.

The air conditioning apparatus AC1 has the function of controlling an indoor temperature Tmp. The indoor temperature Tmp is, the temperature of the air inside the car C1 where the air conditioning apparatus AC1 is provided. The air conditioning apparatus AC1 is configured to discharge cool air or warm air as necessary. Further, the air conditioning apparatus AC1 arbitrarily detects the indoor temperature Tmp.

The brake BK has the function of performing a stop operation, a decelerating operation and the like. The stop operation is an operation for stopping the car C1 where the brake BK is provided. Further, the decelerating operation is an operation for decelerating the car C1 where the brake BK is provided.

The stop operation and the decelerating operation are each an operation of applying pressure to the wheels of the car C1. The brake BK includes a cylinder (not shown).

In a period during which the brake BK is performing the stop operation or the decelerating operation, pressure is applied to the cylinder. Hereinafter, the pressure applied to the cylinder during a period in which the brake BK is performing the stop operation or the decelerating operation is referred to also as the "pressure Prs". The brake BK arbitrarily detects the pressure Prs.

The sensor SN1 has the function of communicating with the air conditioning apparatus AC1 and the brake BK. The sensor SN1 arbitrarily acquires the latest indoor temperature Tmp detected by the air conditioning apparatus AC1. Further, the sensor SN1 arbitrarily acquires the latest pressure Prs detected by the brake BK.

Note that, the interval of the sensor SN1 acquiring the pressure Prs is shorter than the interval of the sensor SN1 acquiring the indoor temperature Tmp. That is, the sampling cycle of the pressure Prs is shorter than the sampling cycle of the indoor temperature Tmp.

Hereinafter, the state of the transport vehicle C10 is referred to also as the "state StC". The state StC is also the state of each of the cars C1. The state StC corresponds to, for example, the indoor temperature Tmp. Further, the state StC corresponds to, for example, the pressure Prs. Hereinafter, the data representing the state StC is referred to also as the "state data StD" or "StD".

The state data StD is, for example, the data representing the indoor temperature Tmp. Further, the state data StD is, for example, the data representing the pressure Prs.

While the details will be given later, the car control part 20 performs a process of handling the state data StD. The communication part 30 has the function of communicating with the ground system 2000 via wireless communication.

The ATC 40 has the function of performing a process of automatically controlling the travel of the car C1 (hereinafter referred to also as the "process AtPr"). The master controller 50 has the function of performing a process of adjusting the speed of the car C1 (hereinafter referred to also as the "process SpPr"). Each of the process AtPr and the process SpPr is a process relating to the travel of the transport vehicle C10.

Note that, the configuration of the control unit Utb is similar to the configuration of the control unit Uta. That is, the control unit Utb includes the control part 10 having the function of performing the process MVPr. Therefore, the onboard system 1000 includes two control parts 10. That is, the control part 10 is set to be redundant.

Further, the control unit Utb is provided at the car C1b corresponding to the end Edb of the transport vehicle C10. That is, the control unit Utb is provided at the end Edb of the transport vehicle C10. Therefore, the control part 10 of the control unit Utb is provided at the end Edb.

Next, a description will be given of the configuration of the control unit Utn. The control unit Utn is different from the control unit Uta in not including the control part 10, the communication part 30, the ATC 40, and the master controller 50. The rest of the configuration and function of the control unit Utn is similar to those of the control unit Uta and, therefore, a detailed description thereof is not repeated.

Note that, the control unit Utn may include a speed control apparatus that controls the traveling speed of the car C1. The speed control apparatus is, for example, an apparatus performing the variable-voltage-variable-frequency control (a VVVF inverter). Further, the control unit Utn may include a static inverter (SIV (Static InVerter)).

Respective car control parts 20 of the m-pieces of control units Ut are configured to be capable of communicating with each other via a communication cable (not shown). For example, respective car control parts 20 of the m-pieces of control units Ut are daisy-chained by a communication cable. Further, in each of the car C1a and the car C1b, the car control part 20 is configured to be capable of communicating with the control part 10.

Next, a description will be given of the operation of each of the control units Ut. With reference to FIGS. 1 and 2, each control unit Utn performs the state data transmission process. In the state data transmission process, every time the sensor SN1 acquires the latest pressure Prs, the sensor SN1 transmits the state data StD representing the pressure Prs to the car control part 20. Further, in the state data transmission process, every time the sensor SN1 acquires the latest indoor temperature Tmp, the sensor SN1 transmits the state data StD representing the indoor temperature Tmp to the car control part 20.

Hereinafter, the control part 10 of the control unit Uta is referred to also as the "control part 10a". Further, hereinafter, the control part 10 of the control unit Utb is referred to also as the "control part 10b". Still further, hereinafter, the car control part 20 of the control unit Uta is referred to also as the "car control part 20a". Still further, hereinafter, the car control part 20 of the control unit Utb is referred to also as the "car control part 20b".

The car control part 20 of each control unit Utn transmits at least one piece of acquired state data StD to the control part 10a and the control part 10b every lapse of a predetermined time (periodically). The predetermined time is, for example, 100 msec.

Note that, every time the car control part 20 of each control unit Utn acquires the state data StD, the car control part 20 may transmit the state data StD to the control part 10a and the control part 10b.

Further, in each of the control unit Uta and the control unit Utb, the above-described state data transmission process is performed. Thus, the car control part 20a and the car control part 20b acquire at least one piece of state data StD.

The car control part 20a transmits, to the control part 10a, the acquired at least one piece of state data StD every lapse of a predetermined time. The predetermined time is, for example, 100 msec. Further, the car control part 20b transmits, to the control part 10b, the acquired at least one piece of state data StD every lapse of a predetermined time.

Note that, the car control part 20a may transmit the state data StD to the control part 10a every time the car control part 20a acquires the state data StD. Further, the car control part 20b may transmit the state data StD to the control part 10b every time the car control part 20b acquires the state data StD.

Each of the control part 10a and the control part 10b manages the received pieces of the state data StD.

Hereinafter, the maintenance process MtPr is simply referred to also as the "MtPr". Further, hereinafter, the process MVPr is simply referred to also as the "MVPr".

The process that each of the control part 10a and the control part 10b performs is set according to a predetermined process execution rule Ru1. FIG. 3 shows an exemplary process allocation table TB1 showing the process execution rule Ru1.

The onboard system 1000 has a plurality of types of process modes. The process modes are each a mode in which a specific constituent performs a predetermined process.

With reference to FIG. 3, the process allocation table TB1 shows process modes A, B. For example, in the process mode A, it is determined that the control part to perform the process MVPr is the control part 10a. Further, in the process mode A, it is determined that the control part to perform the maintenance process MtPr is the control part 10b.

Further, in the process mode B, it is determined that the control part to perform the maintenance process MtPr is the control part 10a. Further, in the process mode B, it is determined that the control part to perform the process MVPr is the control part 10b. For example, in the onboard system 1000 in the process mode B, the control part 10a performs the maintenance process MtPr, and the control part 10b performs the process MVPr.

The process mode of the onboard system 1000 is set based on, for example, the process execution rule Ru1 (the process allocation table TB1) shown in FIG. 3. For example, when the car C1a is the first car, the process mode of the onboard system 1000 is set to the process mode A.

For example, in the onboard system 1000 in the process mode A, the control part 10a performs the process MVPr. Further, in the onboard system 1000 in the process mode A, in a period during which the control part 10a is performing the process MVPr, the control part 10b performs the maintenance process MtPr. Note that, in the period during which the control part 10a is performing the process MVPr, the control part 10b does not perform the process MVPr. That is, the process MVPr is exclusively performed by the control part 10a or the control part 10b.

Further, for example, when the car C1a is the last car, the process mode of the onboard system 1000 is set to the process mode B. That is, the process mode of the onboard system 1000 changes according to a change in the travel state of the transport vehicle C10.

Here, it is assumed that the process mode of the onboard system 1000 has changed from the process mode A to the process mode B. In this case, the onboard system 1000 switches, over the two control parts 10, between the control part to perform the process MVPr and the control part to perform the maintenance process MtPr.

Specifically, when the process mode of the onboard system 1000 has changed from the process mode A to the process mode B, the control part 10a performs the maintenance process MtPr, and the control part 10b performs the process MVPr. In this manner, the control part 10 that performs the process MVPr and the control part 10 that performs the maintenance process MtP are dynamically switched.

Hereinafter, the control part 10 that is performing the process MVPr or the control part 10 to perform the process MVPr is referred to also as the "main control part Mc". The main control part Mc is the control part 10a or the control part 10b. The main control part Mc performs the process MVPr based on each state data StD acquired from each of the control units Ut.

Further, hereinafter, the control part 10 that is not performing the process MVPr is referred to also as the "standby control part Wc". The standby control part Wc is the control part 10a or the control part 10b. Still further, hereinafter, the memory that the standby control part Wc includes is referred to also as the "memory Mr". Still further, hereinafter, the maintenance part 11 included in the standby control part Wc is referred to also as the "maintenance part Wm".

Note that, the standby control part Wc (the maintenance part Wm) is constantly performing the above-described location detection process. Accordingly, the standby control part Wc is constantly detecting the latest location Lc. While the detail will be described later, in a representative value specify process which will be described later, the standby control part Wc (the maintenance part Wm) adds the latest location Lc to each state data StD acquired from each of the control units Ut, and stores the state data StD in the memory Mr.

Note that, the control part 10 transmits the state data StD stored in the memory Mr to the ground system 2000 as necessary.

Note that, provided that all pieces of state data StD for an item whose sampling cycle is short (for example, the pressure Prs) are stored in the memory Mr, the following trouble occurs.

The trouble is, for example, a trouble that the volume of data accumulated in the memory Mr (the onboard system 1000) becomes enormously great. Further, the trouble is a trouble that the transmission cycle of the state data StD becomes short, increasing the load on the communication part 30, whereby the transmission of the state data StD fails.

Accordingly, the standby control part Wc performs the representative value specify process. The representative value specify process is the maintenance process MtPr. The representative value specify process is a process of specifying the representative value of a plurality of values represented by a plurality of pieces of state data StD that the standby control part Wc has acquired over a certain period Tn. The representative value corresponds to the average value, the maximum value, the median value and the like of a plurality of values.

In the representative value specify process, the standby control part Wc processes the state data StD according to a representative value rule table TB2, which will be described later, showing a representative value rule Ru2. The representative value rule Ru2 is a rule for specifying the representative value.

Hereinafter, the pressure Prs is simply referred to also as "Prs". Further, hereinafter, the indoor temperature Tmp is simply referred to also as "Tmp". Still further, hereinafter, the state data StD representing the pressure Prs is referred to also as the "state data StDp" or "StDp". Still further, hereinafter, the state data StD representing the indoor temperature Tmp is referred to also as the "state data StDt" or "StDt".

FIG. 4 shows an exemplary representative value rule table TB2. With reference to FIG. 4, the "target data" is the state data StD being the target of the process. The "period Tn" is the period corresponding to calculation of the representative value. The "calculation method" is the method of calculating the representative value. For example, when the "calculation method" is the "average value", the average value of plurality of values is specified as the representative value.

Further, in the representative value rule table TB2, the "priority" represents the priority in processing the state data StD. In the representative value rule table TB2, as the value of the "priority" is smaller, the state data StD corresponding to that "priority" has a higher processing priority. That is, as the value of the "priority" is smaller, the state data StD corresponding to that "priority" is processed with a higher priority. The representative value rule table TB2 shows that the state data StDp is processed with a higher priority than the state data StDt.

Next, a description will be given of an exemplary state data table TB3 showing a plurality of pieces of state data StDp. FIG. 5 shows an exemplary state data table TB3. With reference to FIG. 5, in the state data table TB3, the "number" is the number for identifying the state data StDp. A plurality of pieces of information aligned in the row direction in the state data table TB3 form one piece of state data StDp. The state data table TB3 in FIG. 5 shows, as an example, three pieces of state data StDp.

In the state data table TB3, the "location information" is the location Lc corresponding to the timing at which the state data StDp is acquired. As described above, the location Lc is represented in latitude and longitude. The "value" is the value of the pressure Prs represented by the state data StDp. The unit of the pressure Prs is, for example, kilopascal.

In the state data table TB3, the "process state" represents whether or not a process on the corresponding state data StDp has been finished. The word "raw" represents that the corresponding state data StDp is raw state data. The word "done" represents that the corresponding state data StDp is processed state data.

Figure 6:
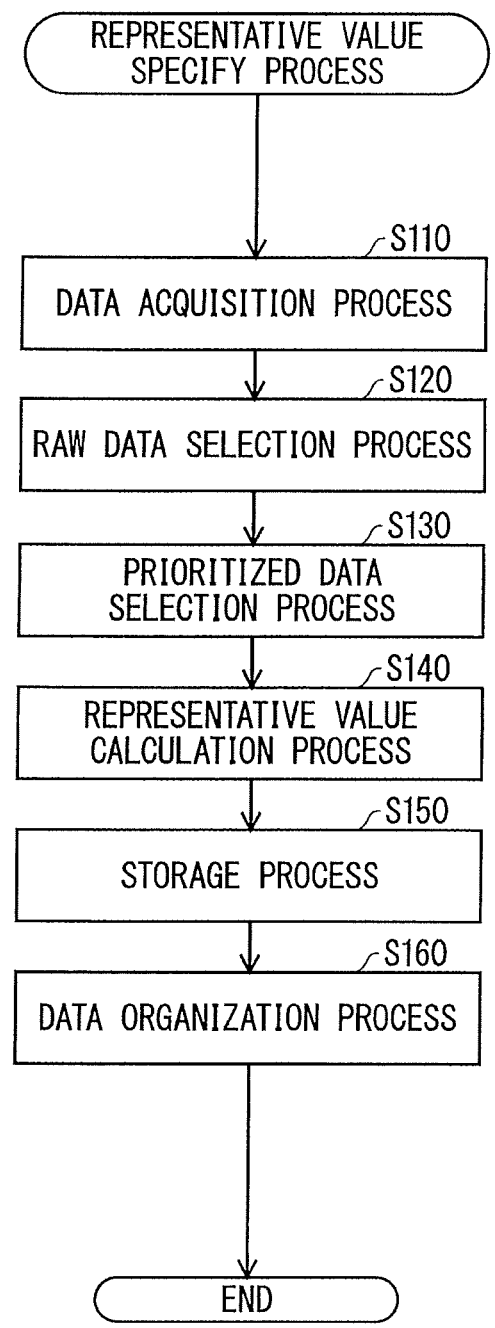
FIG. 6 is a flowchart of a representative value specify process.

Next, a description will be given of the representative value specify process performed by the standby control part Wc (the maintenance part Wm). FIG. 6 is a flowchart of the representative value specify process. Note that, the standby control part Wc is constantly performing the above-described location detection process independently of the representative value specify process. Therefore, the standby control part Wc is constantly detecting the latest location Lc.

Here, the following precondition Pr1 is discussed. In the precondition Pr1, the item whose representative value is to be specified is, as an example, the pressure Prs. Further, in the precondition Pr1, by the above-described state data transmission process being performed, the standby control part Wc successively acquires a plurality of pieces of state data StD.

In the representative value specify process in the precondition Pr1, firstly, the process in Step S110 is performed. In Step S110, the data acquisition process is performed. In the data acquisition process, state data is acquired.

Note that, in the precondition Pr1, as an example, the standby control part Wc acquires 21 pieces of state data StD over 10 seconds. Further, in the precondition Pr1, as an example, the 21 pieces of state data StD include 20 pieces of state data StDp and one piece of state data StDt.

In the data acquisition process in the precondition Pr1, firstly, the standby control part Wc refers to the period Tn shown in the representative value rule table TB2 in FIG. 4. Then, the standby control part Wc successively acquires 21 pieces of state data StD over 10 seconds.

Further, every time the state data StD is acquired, the standby control part Wc adds, to the state data StD, the latest location Lc (the location information) and the word "raw" indicative of the process state. Then, the standby control part Wc stores the 21 pieces of state data StD with the added location Lc and word "raw" in the memory Mr.

In Step S120, the raw data selection process is performed. In the raw data selection process, the raw state data StD is selected. In the raw data selection process in the precondition Pr1, the standby control part Wc selects the 21 pieces of state data StD representing the word "raw" which are stored in the memory Mr.

In Step S130, the prioritized data selection process is performed. In the prioritized data selection process, based on the priority shown in the representative value rule table TB2 in FIG. 4, the standby control part Wc selects the state data StD having the highest priority out of the selected plurality of pieces of state data StD.

Note that, as has been described, in the representative value rule table TB2, as the value of the "priority" is smaller, the state data StD corresponding to that "priority" has a higher processing priority.

In the prioritized data selection process in the precondition Pr1, the state data StDp having the smallest priority value in the representative value rule table TB2 is selected. Specifically, the standby control part Wc selects 20 pieces of state data StDp included in the selected 21 pieces of state data StD.

In Step S140, the representative value calculation process is performed. In the representative value calculation process, based on the "calculation method" shown in the representative value rule table TB2 in FIG. 4 corresponding to the state data StD selected in the prioritized data selection process, the representative value is calculated (specified).

In the representative value calculation process in the precondition Pr1, the standby control part Wc calculates, as the representative value, the average value of the 20 pieces of values of pressure Prs represented by the 20 pieces of state data StDp. Thus, the representative value is specified.

In Step S150, a storage process of storing the representative data representing the representative value in the memory Mr is performed.

In the storage process in the precondition Pr1, the standby control part Wc generates the state data StDp in which the following are described: the location information represented by any of the 20 pieces of state data StDp; the representative value specified in the representative value calculation process; and the word "done" representing the process state. Note that, the location information described in the generated state data StDp is, for example, the location information of the state data StDp firstly acquired by the standby control part Wc out of the 20 pieces of state data StDp. Note that, the location information described in the generated state data StDp is not limited to the foregoing.

Then, the standby control part Wc stores the generated state data StDp in the memory Mr as the representative data.

In Step S160, the data organization process is performed. In the data organization process, the standby control part Wc deletes, from the memory Mr, the state data StDp used in specifying the representative value in the representative value calculation process. Further, the standby control part Wc describes the word "done" representing the process state to the state data StD not selected in the prioritized data selection process.

In the data organization process in the precondition Pr1, the standby control part Wc deletes, from the memory Mr, the 20 pieces of state data StDp used in the representative value calculation process. Further, the standby control part Wc describes the word "done" representing the process state to the one piece of state data StD not selected in the prioritized data selection process. Thus, the representative value specify process ends.

Note that, in the representative value specify process, the state data StD having a low priority and not selected in the prioritized data selection process may possibly be stored in the memory Mr for a long period. Accordingly, when the number of pieces of the raw state data StD is extremely great, a trouble may arise that the available space of the memory Mr reduces. In order to prevent this trouble, a ground-destined transmission process of transmitting part or all of the raw state data StD to the ground system 2000 may be performed.

The ground-destined transmission process is the maintenance process MtPr. The ground-destined transmission process is performed by the standby control part Wc (the maintenance part Wm). Hereinafter, the data to be transmitted to the ground system 2000 is referred to also as the "transmission target data".

In the ground-destined transmission process, the standby control part Wc transmits the transmission target data to the ground system 2000 via the communication part 30. The transmission target data is transmitted every lapse of a predetermined time (periodically). The ground system 2000 has memory (not shown) for storing the received transmission target data (the state data StD). The ground system 2000 performs a deterioration diagnosis process and the like which will be described later using the received state data StD.

Note that, independently of the ground-destined transmission process, the following data transmission preparation process is performed. The data transmission preparation process is the maintenance process MtPr. The data transmission preparation process is performed by the standby control part Wc (the maintenance part Wm).

Hereinafter, the whole capacity of the memory Mr for storing data is referred to also as the "storable capacity Dmax" or "Dmax". Further, hereinafter, the capacity obtained by subtracting predetermined available space from the storable capacity Dmax is referred to also as the "allowable storage capacity Da" or "Da". The allowable storage capacity Da is, for example, 0.8 times as great as the storable capacity Dmax.

Hereinafter, the total volume of data actually stored in the data memory Mr is referred to also as the "stored volume Dr". Further, hereinafter, raw state data StD is referred to also as the "raw data". The raw data shows the word "raw".

Figure 7:
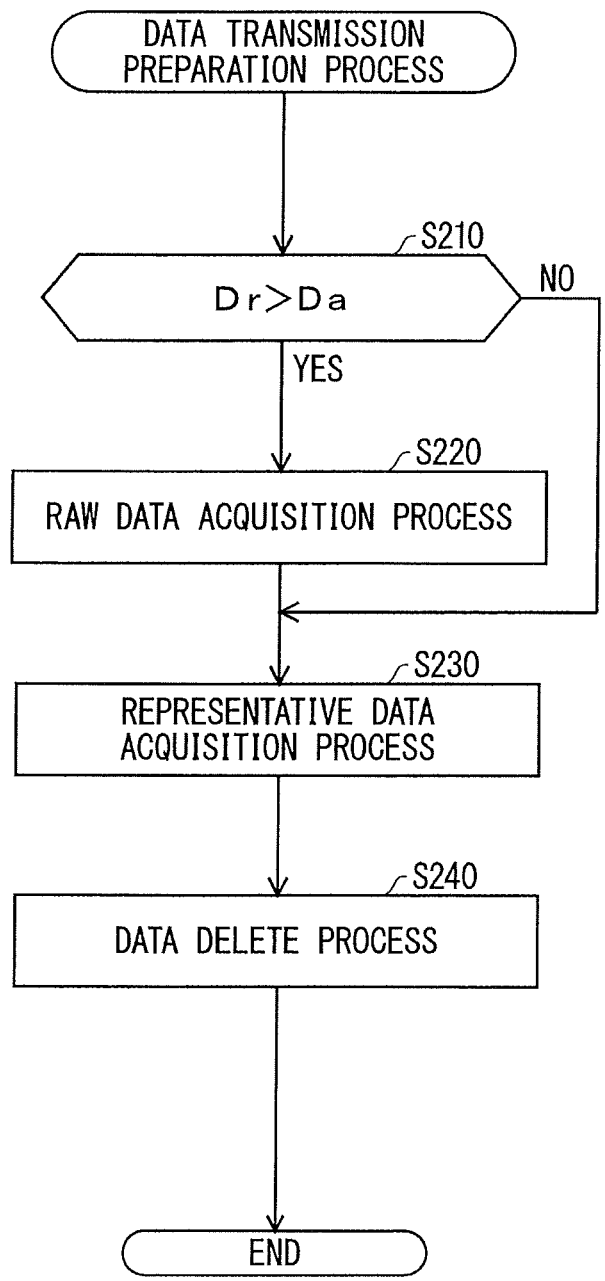
FIG. 7 is a flowchart of a data transmission preparation process.

FIG. 7 is a flowchart of the data transmission preparation process. Here, the following precondition Pr2 is discussed. In the precondition Pr2, the memory Mr stores a plurality of pieces of state data StD being the raw data. Further, in the precondition Pr2, the memory Mr stores a plurality of pieces of state data StD being the representative data. Further, in the precondition Pr2, the stored volume Dr is greater than the allowable storage capacity Da.

In the data transmission preparation process in the precondition Pr2, firstly, the process in Step S210 is performed. In Step S210, the standby control part Wc determines whether or not the stored volume Dr is greater than the allowable storage capacity Da. When YES in Step S210, the control transits to Step S220. On the other hand, when NO in Step S210, the control transits to Step S230. In the precondition Pr2, since the stored volume Dr is greater than the allowable storage capacity Da, the control transits to Step S220.

In Step S220, a raw data acquisition process is performed. In the raw data acquisition process, the standby control part Wc reads, as the transmission target data, a plurality of pieces of raw data (the state data StD) stored in the memory Mr from the memory Mr. Thus, the standby control part Wc acquires the transmission target data. Note that, the standby control part Wc may perform a data compression process for compressing the transmission target data.

In Step S230, the representative data acquisition process is performed. In the representative data acquisition process, the standby control part Wc reads, as the transmission target data, a plurality of pieces of representative data (the state data StD) stored in the memory Mr from the memory Mr. Thus, the standby control part Wc acquires the transmission target data. Note that, the standby control part Wc may perform the data compression process for compressing the transmission target data.

Note that, in the ground-destined transmission process, the standby control part Wc transmits the plurality of pieces of transmission target data acquired in Steps S220, S230 to the ground system 2000 via the communication part 30. The transmission target data is transmitted every lapse of a predetermined time (periodically). The predetermined time is, for example, 100 msec.

In Step S240, a data delete process is performed. In the data delete process, the standby control part Wc deletes the transmission target data transmitted to the ground system 2000 in the ground-destined transmission process.

Thus, the data transmission preparation process ends. Note that, the data transmission preparation process is repeatedly performed.

Note that, the standby control part Wc performs a deterioration diagnosis process. The deterioration diagnosis process is the maintenance process MtPr. In the deterioration diagnosis process, for example, the standby control part Wc diagnoses the deterioration degree of the brake BK. For example, based on the value of the pressure Prs represented by the state data StDp acquired by the standby control part Wc in the above-described state data transmission process, the standby control part Wc diagnoses the deterioration degree of the brake BK. Note that, the deterioration diagnosis process is performed also in the ground system 2000 as necessary.

As has been described above, according to the present embodiment, the onboard system 1000 includes two control parts 10. Each of the two control parts 10 has the function of performing the process MVPr for controlling the travel of the transport vehicle C10. In a period during which the control part 10*a* being one of the two control parts 10 is performing the process MVPr, the control part 10*b* being other one of the two control parts 10 does not perform the process MVPr. The control part 10*b* performs, in the period during which the control part 10*a* is performing the process MVPr, the maintenance process MtPr for performing maintenance of the transport vehicle C10.

Thus, in the configuration in which a transport vehicle includes two control parts, the control part not performing a process for controlling the travel of the transport vehicle can be effectively used.

Further, in the present embodiment, the onboard system 1000 switches, over the two control parts 10, between the control part to perform the process MVPr and the control part to perform the maintenance process MtPr.

Accordingly, the present embodiment can dispense with, for example, a dedicated CPU that exhibits high processing performance for performing the maintenance process MtPr. Further, for example, the present embodiment can also dispense with dedicated memory for storing the state data of various types of devices. Still further, the present embodiment can efficiently perform the maintenance process MtPr. Accordingly, the present embodiment implements an onboard system dispensing with a CPU or memory that exhibits high processing performance for performing the maintenance process MtPr.

Note that, in the related art A, a process for detecting an abnormality of a car is performed. In this process, for example, the maximum value, the average value and the like for a plurality of pieces of sampling data (the state data of devices) must be calculated.

In order to perform such a process, the sensor module must temporarily retain the state data of the devices. Therefore, the related art A has the problem in necessitating a CPU that exhibits high processing performance and dedicated memory for retaining the state data of various types of devices for performing the maintenance process in the sensor module.

On the other hand, the onboard system 1000 according to the present embodiment is configured as described above. Therefore, the onboard system 1000 can solve the above-described problem.

Second Embodiment

The present embodiment has the configuration in which two control parts 10 are provided at each of the cars C1a, C1b of the transport vehicle C10 (hereinafter referred to also as the "configuration CtA"). Hereinafter, the maintenance system to which the configuration CtA is applied is referred to also as the "maintenance system 5000A".

Further, hereinafter, the control unit Uta to which the configuration CtA is applied is referred to also as the "control unit UtaA". Further, hereinafter, the control unit Utb to which the configuration CtA is applied is referred to also as the "control unit UtbA".

The maintenance system 5000A is different from the maintenance system 5000 shown in FIG. 1 in including an onboard system 1000A in place of the onboard system 1000. The rest of the configuration and function of the maintenance system 5000A is similar to those of the maintenance system 5000 and, therefore, a detailed description thereof is not repeated. The onboard system 1000A is provided at the transport vehicle C10 shown in FIG. 1.

Figure 8:
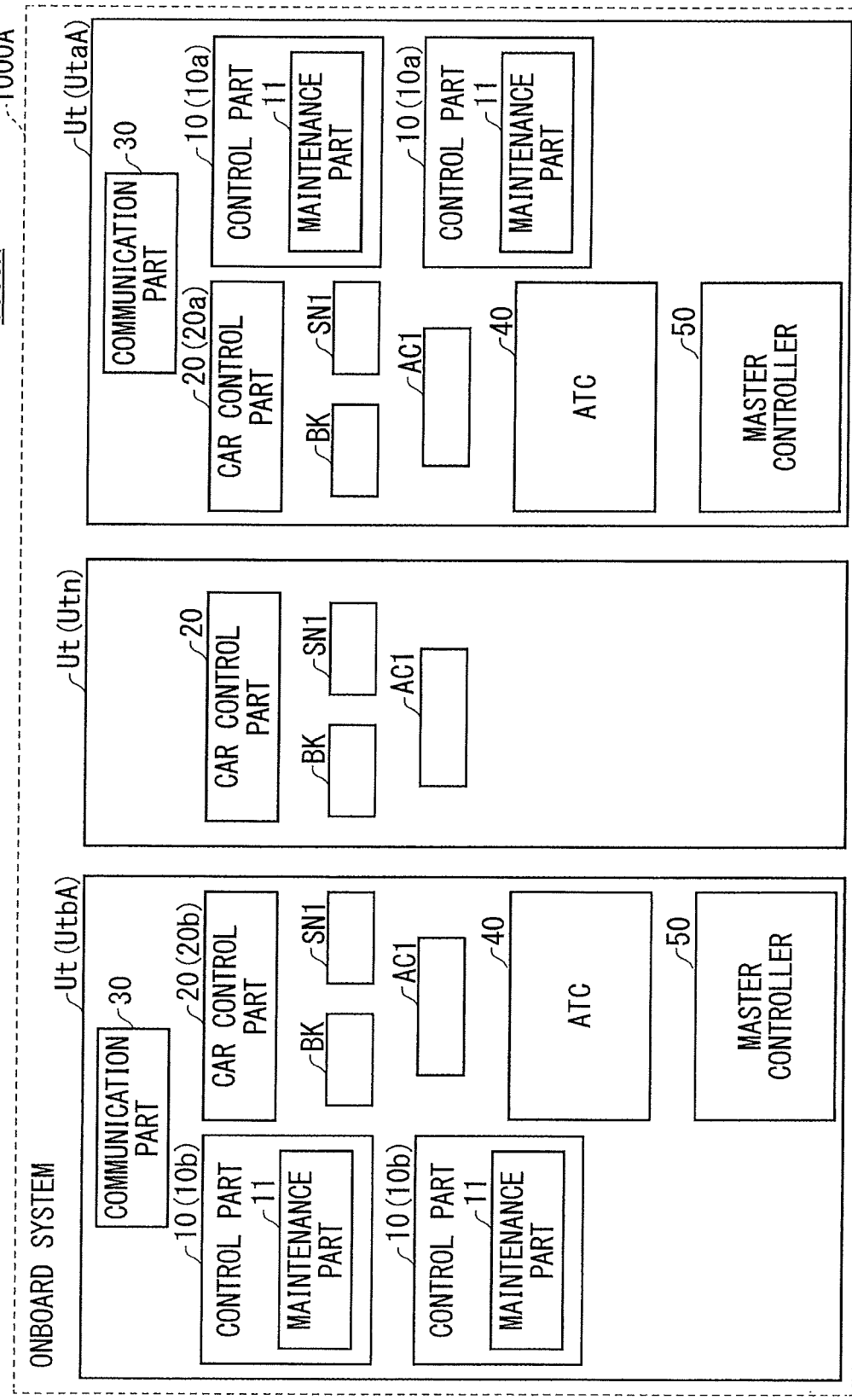
FIG. 8 is a block diagram showing the configuration of a maintenance system according to a second embodiment of the present invention.

FIG. 8 is a block diagram showing the configuration of the maintenance system 5000A according to the second embodiment of the present invention. Note that, in order to simplify the illustration, FIG. 8 just shows the onboard system 1000A included in the maintenance system 5000A.

With reference to FIG. 8, the onboard system 1000A is different from the onboard system 1000 shown in FIG. 2 in including a control unit UtaA in place of the control unit Uta and including a control unit UtbA in place of the control unit Utb. The rest of the configuration and function of the onboard system 1000A is similar to those of the onboard system 1000 and, therefore, a detailed description thereof is not repeated.

Similarly to the first embodiment, the onboard system 1000A performs various types of processes described in the first embodiment. The various types of processes are, for example, the representative value specify process, the data transmission preparation process, the ground-destined transmission process, the deterioration diagnosis process and the like.

The control unit UtaA is different from the control unit Uta shown in FIG. 2 in including two control parts 10 (10a). The rest of the configuration and function of the control unit UtaA is similar to those of the control unit Uta and, therefore, a detailed description thereof is not repeated. The configuration and function of each of the two control parts 10 (10a) included in the control unit UtaA are similar to those of the control part 10 (10a) of the control unit Uta.

The control unit UtaA is provided at the car C1a corresponding to the end Eda of the transport vehicle C10. That is, the control unit UtaA is provided at the end Eda of the transport vehicle C10. Accordingly, the two control parts 10 (10a) of the control unit UtaA are provided at the end Eda.

The control unit UtbA is different from the control unit Utb shown in FIG. 2 in including two control parts 10 (10b). The rest of the configuration and function of the control unit UtbA is similar to those of the control unit Utb and, therefore, a detailed description thereof is not repeated. The configuration and function of each of the two control parts 10 (10b) included in the control unit UtbA are similar to those of the control part 10 (10b) of the control unit Utb.

The control unit UtbA is provided at the car C1b corresponding to the end Edb of the transport vehicle C10. That is, the control unit UtbA is provided at the end Edb of the transport vehicle C10. Accordingly, the two control parts 10 (10b) of the control unit UtbA are provided at the end Edb.

Thus, the onboard system 1000A includes four control parts 10. The four control parts 10 are formed by two control parts 10 (10a) provided at the end Eda (the car C1a) and two control parts 10 (10b) provided at the end Edb (the car C1b).

Further, each of the four control parts 10 has the function of performing the process MVPr. Note that, in some cases, the control part 10 that is performing the process MVPr (the above-described main control part Mc) fails.

In the case where the main control part Mc has failed, the other control part 10 performs the process MVPr in place of the failed main control part Mc. Hereinafter, the other control part 10 that performs the process MVPr in place of the failed main control part Mc is referred to also as the "backup control part Bc". The backup control part Bc is the control part for backing up the main control part Mc.

The four control parts 10 are formed by two control parts 10a and two control parts 10b. The process performed by each of the four control parts 10 is set by a predetermined process execution rule Ru1A. The process execution rule Ru1A is a double-system rule.

Specifically, the process execution rule Ru1A defines that, in the four control parts 10, one control part 10 operates as the backup control part Bc, and two control parts 10 perform the maintenance process MtPr.

Hereinafter, one of the two control parts 10a is referred to also as the "control part 10aX". The control part 10aX is, for example out of the two control parts 10a shown in FIG. 8, the upper control part 10a. Further, hereinafter, the other one of the two control parts 10a is referred to also as the "control part 10aY".

Further, hereinafter, one of the two control parts 10b is referred to also as the "control part 10bX". The control part 10bX is, for example out of the two control parts 10b shown in FIG. 8, the upper control part 10b. Further, hereinafter, the other one of the two control parts 10b is referred to also as the "control part 10bY".

Similarly to the onboard system 1000, the onboard system 1000A has a plurality of types of process modes.

FIG. 9 shows an exemplary process allocation table TB1A showing the process execution rule Ru1A. With reference to FIG. 9, the process allocation table TB1A shows process modes C, D, E, F. In the process allocation table TB1A, the "BkUp" means that the corresponding control part 10 serves as the backup control part Bc.

For example, in the process mode C, it is defined that the control part to perform the process MVPr is the control part 10aX. Further, in the process mode C, it is defined that the control part 10aY operates as the backup control part Bc. Further, in the process mode C, it is defined that the control part to perform the maintenance process MtPr is the control parts 10bX, 10bY.

The process mode of the onboard system 1000A is set based on, for example, the process execution rule Ru1A (the process allocation table TB1A) shown in FIG. 9. For example, when the car C1a is the first car, the process mode of the onboard system 1000A is set to the process mode C. For example, in the onboard system 1000A in the process mode C, the control part 10aX (the main control part Mc) performs the process MVPr. Further, in the onboard system 1000A in the process mode C, the control part 10aY operates as the backup control part Bc. Further, in the onboard system 1000A in the process mode C, each of the control parts 10bX, 10bY performs the maintenance process MtPr in a period during which the main control part Mc is performing the process MVPr. Note that, in the period during which the control part 10aX is performing the process MVPr, each of the control parts 10aY, 10bX, 10bY does not perform the process MVPr.

Note that, for example, in the onboard system 1000A in the process mode D, the control part 10aY (the main control part Mc) performs the process MVPr. Further, in the onboard system 1000A in the process mode D, the control part 10aX operates as the backup control part Bc. Still further, in the onboard system 1000A in the process mode D, each of the control parts 10bX, 10bY performs the maintenance process MtPr in a period during which the main control part Mc is performing the process MVPr.

That is, the four control parts 10 included in the onboard system 1000A according to the process allocation table TB1A are formed by: one control part 10 (the main control part Mc) that performs the process MVPr; one control part 10 that performs the process MVPr upon a failure of the main control part Mc; and two control parts 10 that perform the maintenance process MtPr in a period during which the main control part Mc is performing the process MVPr.

That is, in the onboard system 1000A according to the process allocation table TB1A, the two control parts 10 perform a plurality of types of maintenance processes MtPr in a distributed manner. For example, in a period during which the one control part 10 is repeatedly performing the data transmission preparation process as the maintenance process MtPr shown in FIG. 7 and the data transmission preparation process is being performed, the other one control part 10 performs the above-described ground-destined transmission process as the maintenance process MtPr.

Thus, by the plurality of types of maintenance processes MtPr being processed in a distributed manner, the processing speed of each of the maintenance processes MtPr can be increased. Therefore, the maintenance process MtPr is efficiently performed. Further, by a plurality of types of maintenance processes MtPr being processed in a distributed manner, for example, the process of raw state data StD having a low priority can be completed.

Note that, one control part 10 out of the two control parts 10 to perform the maintenance process MtPr may perform just the deterioration diagnosis process. In this case, the control part to perform the deterioration diagnosis process 10 holds the logic for performing the deterioration diagnosis process.

Here, it is assumed that, in the onboard system 1000A in the process mode C, the control part 10aX has failed. In this case, the control part 10aY as the backup control part Bc performs the process MVPr. Further, one of the control parts 10bX, 10bY operates as the backup control part Bc. Still further, other one of the control parts 10bX, 10bY performs the maintenance process MtPr.

Further, similarly to the onboard system 1000, the process mode of the onboard system 1000A changes according to a change in the travel state of the transport vehicle C10. Here, it is assumed that the process mode of the onboard system 1000A has changed from the process mode C to the process mode D. In this case, the onboard system 1000A switches, over the four control parts 10, between the control part to perform the process MVPr and the control part to perform the maintenance process MtPr.

Specifically, when the process mode of the onboard system 1000A has changed from the process mode C to the process mode D, each of the control parts 10bX, 10bY performs the maintenance process MtPr, and the control part 10aY performs the process MVPr. In this manner, the control part 10 that performs the process MVPr and the control part 10 that performs the maintenance process MtP are dynamically switched.

Note that, the process performed by each of the four control parts 10 may be set by the following predetermined process execution rule Ru1AX. The process execution rule Ru1AX is a triple-system rule. Specifically, in the process execution rule Ru1AX, it is defined that, among the four control parts 10, two control parts 10 operate as the backup control parts Bc and one control part 10 performs the maintenance process MtPr.

FIG. 10 shows an exemplary process allocation table TB1AX showing the process execution rule Ru1AX. With reference to FIG. 10, in the process allocation table TB1AX, the process modes G, H, I, J are shown.

The present embodiment may have the configuration (hereinafter referred to also as the "configuration CtAx") in which, for example, the process mode of the onboard system 1000A is set based on the process execution rule Ru1A (the process allocation table TB1AX) shown in FIG. 10.

In the configuration CtAx, for example, in the onboard system 1000A in the process mode G, the control part 10aX (the main control part Mc) performs the process MVPr. Further, in the onboard system 1000A in the process mode G, each of the control parts 10aY, 10bX operates as the backup control part Bc. Still further, in the onboard system 1000A in the process mode G, the control part 10bY performs the maintenance process MtPr in a period during which the main control part Mc is performing the process MVPr.

Further, for example, in the onboard system 1000A in the process mode H, the control part 10aY (the main control part Mc) performs the process MVPr. Further, in the onboard system 1000A in the process mode H, each of the control parts 10aX, 10bX operates as the backup control part Bc. Still further, in the onboard system 1000A in the process mode H, the control part 10bY performs the maintenance process MtPr in a period during which the main control part Mc is performing the process MVPr.

That is, four control parts 10 included in the onboard system 1000A according to the process allocation table TB1AX are formed by: one control part 10 (the main control part Mc) that performs the process MVPr; two control parts 10 to perform the process MVPr upon a failure of the main control part Mc; and one control part 10 that performs the maintenance process MtPr in a period during which the main control part Mc is performing the process MVPr.

Further, for example, similarly to the onboard system 1000, the process mode of the onboard system 1000A in the configuration CtAx changes according to a change in the travel state of the transport vehicle C10. Here, it is assumed that the process mode of the onboard system 1000A has changed from the process mode G to the process mode H. In this case, the onboard system 1000A in the configuration CtAx switches, over the four control parts 10, between the control part to perform the process MVPr and the control part to perform the maintenance process MtPr.

Specifically, when the process mode of the onboard system 1000A has changed from the process mode G to the process mode H, the control part 10bY performs the maintenance process MtPr, and the control part 10aY performs the process MVPr. In this manner, the control part 10 that performs the process MVPr and the control part 10 that performs the maintenance process MtP are dynamically switched.

As has been described above, in the onboard system 1000A according to the present embodiment, two control parts 10 perform a plurality of types of maintenance processes MtPr in a distributed manner. Accordingly, in the state where the control parts are set to be redundant, a plurality of types of maintenance processes MtPr are performed. Note that, the present embodiment also exhibits the effect similar to that the first embodiment exhibits.

Third Embodiment

The configuration of the present embodiment is the configuration in which an onboard system is provided at a transport vehicle C10B, which will be described later (hereinafter referred to also as the "configuration CtB"). Hereinafter, the maintenance system to which the configuration CtB is applied is referred to also as the "maintenance system 5000B".

Figure 11:
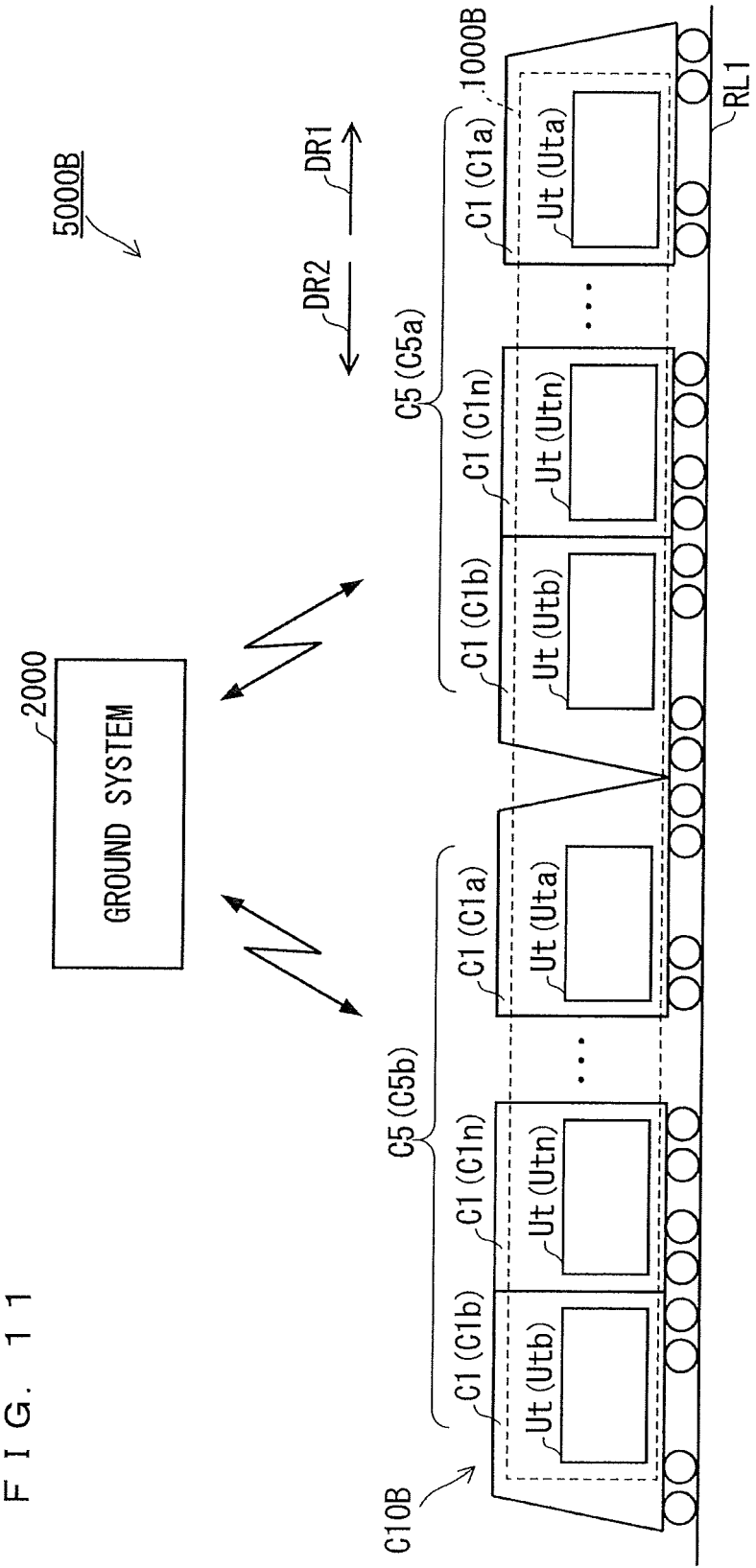
FIG. 11 shows the configuration of a maintenance system according to a third embodiment of the present invention.

FIG. 11 shows the configuration of the maintenance system 5000B according to a third embodiment of the present invention. Note that, for the sake of convenience, FIG. 11 shows also the configuration not included in the maintenance system 5000B (for example, the transport vehicle C10B, the route RL1 and the like).

The transport vehicle C10B is a vehicle for transporting people. The transport vehicle C10B is, for example, a train. The transport vehicle C10B travels along the previously provided route RL1. The transport vehicle C10B normally travels in the direction DR1. Note that, depending on the situation of the transport vehicle C10B, the transport vehicle C10B travels in the direction DR2.

In the present embodiment, similarly to the first embodiment, the state of the transport vehicle C10B is referred to also as the "state StC". The state StC is also the state of each of the cars C1 forming a unit train C5. The state StC corresponds to, for example, the indoor temperature Tmp. Further, the state StC corresponds to, for example, the pressure Prs. In the present embodiment, similarly to the first embodiment, the data representing the state StC is referred to also as the "state data StD" or "StD".

The transport vehicle C10B is formed by k-pieces of unit trains C5. "k" is a natural number of 2 or greater. In the present embodiment, "k" is 2. Note that, "k" may be 3 or greater. The k-pieces of unit trains C5 are linearly coupled to each other.

Each of the unit trains C5 is formed by an m-pieces of cars C1. "m" is a natural number of 2 or greater. The m-pieces of cars C1 are linearly coupled to each other. Note that, the unit trains C5 may be different from each other in the number of their constituent cars C1.

Hereinafter, one end of the unit train C5 is referred to also as the "end Eda". Further, hereinafter, the car C1 corresponding to the end Eda of the unit train C5 is referred to also as the "car C1a". Still further, hereinafter, the other end of the unit train C5 is referred to also as the "end Edb". Still further, hereinafter, the car C1 corresponding to the end Edb of the unit train C5 is referred to also as the "car C1b".

Further, hereinafter, out of the m-pieces of cars C1 forming each unit train C5, the car C1 between the car C1a and the car C1b is referred to also as the "car C1n".

The maintenance system 5000B is different from the maintenance system 5000 shown in FIG. 1 in including an onboard system 1000B in place of the onboard system 1000. The rest of the configuration and function of the maintenance system 5000B is similar to those of the maintenance system 5000 and, therefore, a detailed description thereof is not repeated.

The onboard system 1000B is provided at the transport vehicle C10B shown in FIG. 11. Further, the onboard system 1000B has the function of communicating with the ground system 2000 provided on the ground.

Similarly to the first embodiment, the onboard system 1000B performs various types of processes described in the first embodiment. The various types of processes are, for example, the representative value specify process, the data transmission preparation process, the ground-destined transmission process, the deterioration diagnosis process and the like.

That is, the control part 10 included in the onboard system 1000B performs the maintenance process MtPr similarly to the first embodiment. The maintenance process MtPr in the configuration CtB is a process for performing the maintenance of the transport vehicle C10B.

The onboard system 1000B includes n-pieces of control units Ut. "n" is a natural number of 4 or greater. "n" is the value obtained by multiplying m by k. For example, when m is 10 and k is 2, "n" is 20. The control unit Ut is provided at each of the m-pieces of cars C1 forming each unit train C5. That is, an m-pieces of control units Ut are provided at each unit train C5.

Further, the k-pieces of unit trains C5 are configured to be capable of communicating with each other via a communication cable (not shown). Note that, the k-pieces of unit trains C5 may be configured so as to be capable of communicating with each other via wireless communication.

Further, in each unit train C5, the m-pieces of control units Ut are configured to be capable of communicating with each other via a communication cable (not shown). Note that, in each unit train C5, the m-pieces of control units Ut may be configured so as to be capable of communicating with each other via wireless communication.

Hereinafter, the control unit Ut provided at the car C1a is referred to also as the "control unit Uta". Further, hereinafter, the control unit Ut provided at the car C1b is referred to also as the "control unit Utb". Still further, hereinafter, the control unit Ut provided at the car C1n is referred to also as the "control unit Utn".

Figure 12:
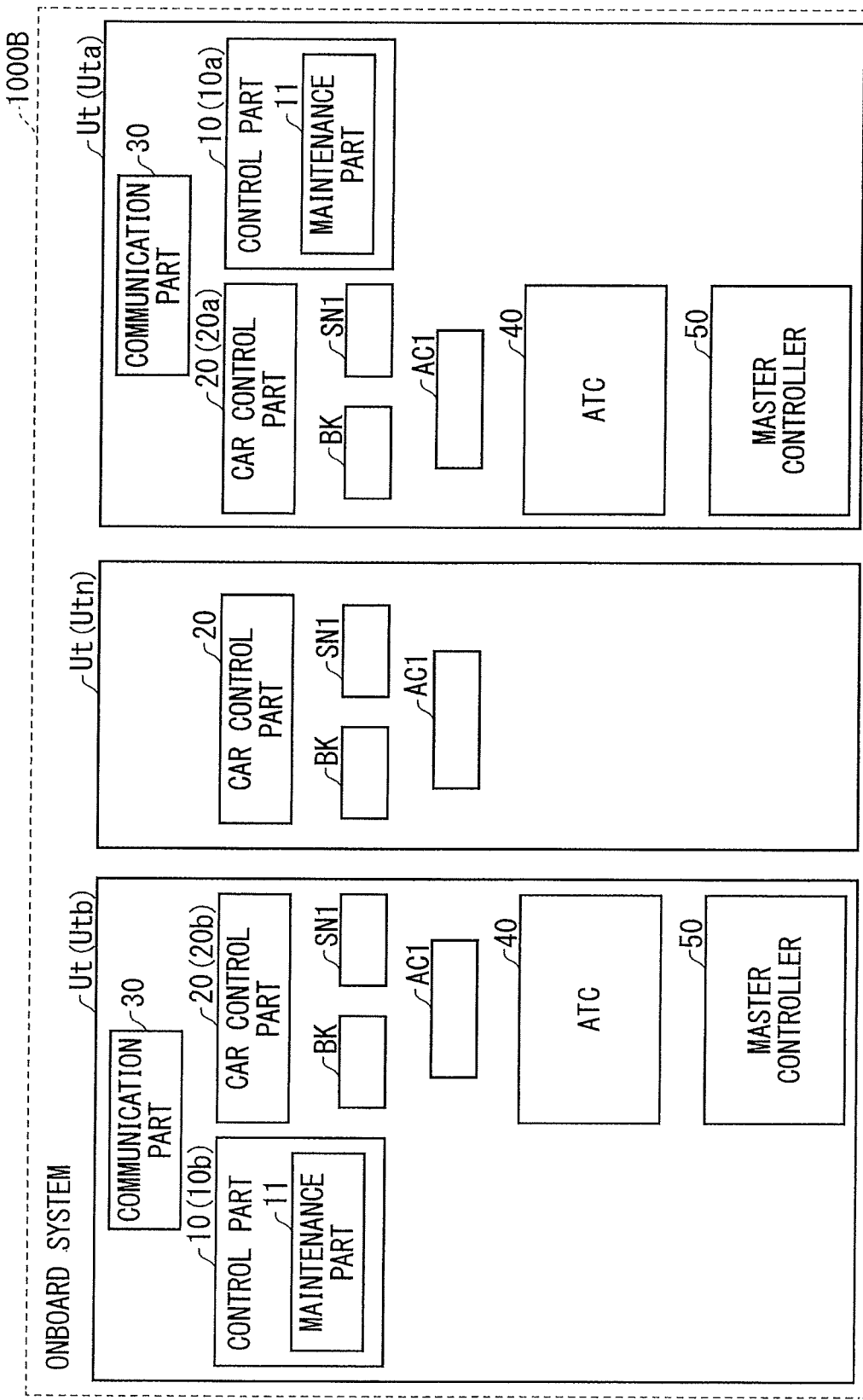
FIG. 12 is a block diagram showing the configuration of an onboard system according to a third embodiment of the present invention.

FIG. 12 is a block diagram showing the configuration of the onboard system 1000B according to the third embodiment of the present invention. Note that, for the sake of easier understanding of the configuration, FIG. 12 shows just three control units Ut. The three control units Ut are the control unit Uta, the control unit Utb, and the control unit Utn.

With reference to FIG. 12, the configuration and function of the control unit Uta are similar to those of the control unit Uta shown in FIG. 2. Further, the configuration and function of the control unit Utb are similar to those of the control unit Utb shown in FIG. 2. Still further, the configuration and function of the control unit Utn are similar to those of the control unit Utn shown in FIG. 2.

Hereinafter, the unit train C5 corresponding to one end of the k-pieces of unit trains C5 is referred to also as the "unit train C5a". Further, hereinafter, the unit train C5 corresponding to the other end of the k-pieces of unit trains C5 is referred to also as the "unit train C5b".

Note that, the control unit Uta is provided at the car C1a corresponding to the end Eda of each unit train C5. That is, the control unit Uta is provided at the end Eda to each unit train C5. Therefore, the control part 10 (10a) of the control unit Uta is provided at the end Eda.

Further, the control unit Utb is provided at the car C1b corresponding to the end Edb of each unit train C5. That is, the control unit Utb is provided at the end Edb of each unit train C5. Therefore, the control part 10 (10b) of the control unit Utb is provided at the end Edb. Therefore, each of the unit trains C5 includes two control parts 10.

In the present embodiment, the transport vehicle C10B is formed by two unit trains C5. Accordingly, the onboard system 1000B includes four control parts 10. The four control parts 10 are formed by two control parts 10a and two control parts 10b. At the unit train C5a, the control parts 10a, 10b are provided. At the unit train C5b, the control parts 10a, 10b are provided.

Similarly to the second embodiment, in the present embodiment also, the process that each of the four control parts 10 performs is set according to the predetermined process execution rule Ru1A.

Similarly to the second embodiment, in the present embodiment, one of the two control parts 10a is referred to also as the "control part 10aX". The control part 10aX is, for example, the control part 10a provided at the unit train C5a. Further, in the present embodiment, the other one of the two control parts 10a is referred to also as the "control part 10aY".

Further, in the present embodiment, one of the two control parts 10b is referred to also as the "control part 10bX". The control part 10bX is, for example, the control part 10b provided at the unit train C5b. Further, in the present embodiment, the other one of the two control parts 10b is referred to also as the "control part 10bY".

Similarly to the onboard system 1000, the onboard system 1000B has a plurality of types of process modes. Similarly to the second embodiment, the process mode of the onboard system 1000B is set based on, for example, the process execution rule Ru1A (the process allocation table TB1A) shown in FIG. 9.

For example, in the onboard system 1000B in the process mode C, the control part 10aX (the main control part Mc) performs the process MVPr. Further, in the onboard system 1000B in the process mode C, the control part 10aY operates as the backup control part Bc. Further, in the onboard system 1000B in the process mode C, each of the control parts 10bX, 10bY performs the maintenance process MtPr in a period during which the main control part Mc is performing the process MVPr. Note that, in the period during which the control part 10aX is performing the process MVPr, each of the control parts 10aY, 10bX, 10bY does not perform the process MVPr.

That is, in the onboard system 1000B according to the process allocation table TB1A, two control parts 10 perform two types of maintenance processes MtPr in a distributed manner.

Note that, the process that each of the four control parts 10 performs may be set according to a predetermined process execution rule so that three control parts 10 perform a plurality of types of maintenance processes MtPr in a distributed manner.

In this case, for example, the four control parts 10 include one control part 10 (the main control part Mc) that performs the process MVPr, and the other three control parts 10 (the standby control parts Wc) excluding the main control part Mc from the four control parts 10.

Each of the three control parts 10 does not perform the process MVPr in a period during which the main control part Mc is performing the process MVPr. The three control parts 10 perform a plurality of types of maintenance processes MtPr in a distributed manner in the period during which the main control part Mc is performing the process MVPr.

Further, the configuration of the transport vehicle C10B may be changed. For example, in some cases, a process of releasing the coupling of the k-pieces of unit trains C5 (hereinafter referred to also as the "coupling release process") is performed. When the coupling release process is performed, the following data external transmission process is performed.

Here, the following precondition Pr3 is discussed. In the precondition Pr3, the transport vehicle C10B (the k-pieces of unit trains C5) includes a unit train C5a and a unit train C5b coupled to each other. Hereinafter, each of the control units Uta, Utb provided at the unit train C5a is referred to also as the "control unit UtCa". Further, hereinafter, each of the control units Uta, Utb provided at the unit train C5b is referred to also as the "control unit UtCb".

Further, in the precondition Pr3, the control part 10 of the control unit UtCa provided at the unit train C5a retains the state data StD representing the state of the unit train C5b. Further, in the precondition Pr3, in the coupling release process, the coupling between the unit train C5a and the unit train C5b is released.

In a data external transmission process in the precondition Pr3, when the coupling between the unit train C5a and the unit train C5b is released, the control unit UtCa (the control part 10) provided at the unit train C5a transmits the state data StD to the control unit UtCb (the unit train C5b).

Thus, also in the case where the coupling release process is performed, the control part 10 of the control unit UtCb of the unit train C5b can properly process the raw state data StD.

Note that, in the data external transmission process in the precondition Pr3, the control unit UtCa (the control part 10) may transmit the state data StD to the ground system 2000 when the coupling between the unit train C5a and the unit train C5b is released.

As has been described above, according to the present embodiment, when the number of the standby control part Wc is changed by execution of the coupling the unit trains or the releasing the coupling of the unit trains, the processing volume of the plurality of types of maintenance processes MtPr is changed by increasing the number of the standby control part Wc or adding a CPU or the like. Thus, a plurality of types of maintenance processes MtPr can be efficiently performed. Thus, the onboard system 1000B that supports the releasing the coupling of the unit trains is implemented. Note that, the present embodiment also exhibits the effect similar to that the first embodiment exhibits.

Note that, it is also possible to employ the configuration in which the transport vehicle C10B is formed by three or more unit trains C5 including the unit trains C5a, C5b (hereinafter referred to also as the "configuration CtBx"). The onboard system 1000B in the configuration CtBx includes u-pieces of control parts 10. "u" is a natural number of 4 or greater. Each of the u-pieces of control parts 10 has the function of performing the process MVPr.

In the configuration CtBx, the process that each of the u-pieces of control parts 10 performs is set according to a predetermined process execution rule so that the three or more control parts 10 perform a plurality of types of maintenance processes MtPr in a distributed manner.

Accordingly, for example, the u-pieces of control parts 10 include one control part 10 (the main control part Mc) that performs the process MVPr, and three or more control parts 10 excluding the main control part Mc from the u-pieces of control parts 10.

Each of the three or more control parts 10 does not perform the process MVPr in a period during which the main control part Mc is performing the process MVPr. The three or more control parts 10 perform a plurality of types of maintenance processes MtPr in a distributed manner in the period during which the main control part Mc is performing the process MVPr.

Note that, the control part 10 (the standby control part Wc) included in each unit train C5 may perform the maintenance process MtPr in the corresponding unit train C5.

Fourth Embodiment

The configuration of the present embodiment is the configuration in which a maintenance part 11 is provided at a constituent other than the control part 10 (hereinafter referred to also as the "configuration CtC"). Hereinafter, the maintenance system to which the configuration CtC is applied is referred to also as the "maintenance system 5000C".

Further, hereinafter, the control unit Uta to which the configuration CtC is applied is referred to also as the "control unit UtaC". Still further, hereinafter, the control unit Utb to which the configuration CtC is applied is referred to also as the "control unit UtbC".

The maintenance system 5000C is different from the maintenance system 5000 shown in FIG. 1 in including an onboard system 1000C in place of the onboard system 1000. The rest of the configuration and function of the maintenance system 5000C is similar to those of the maintenance system 5000 and, therefore, a detailed description thereof is not repeated. The onboard system 1000C is provided at the transport vehicle C10 shown in FIG. 1.

Figure 13:
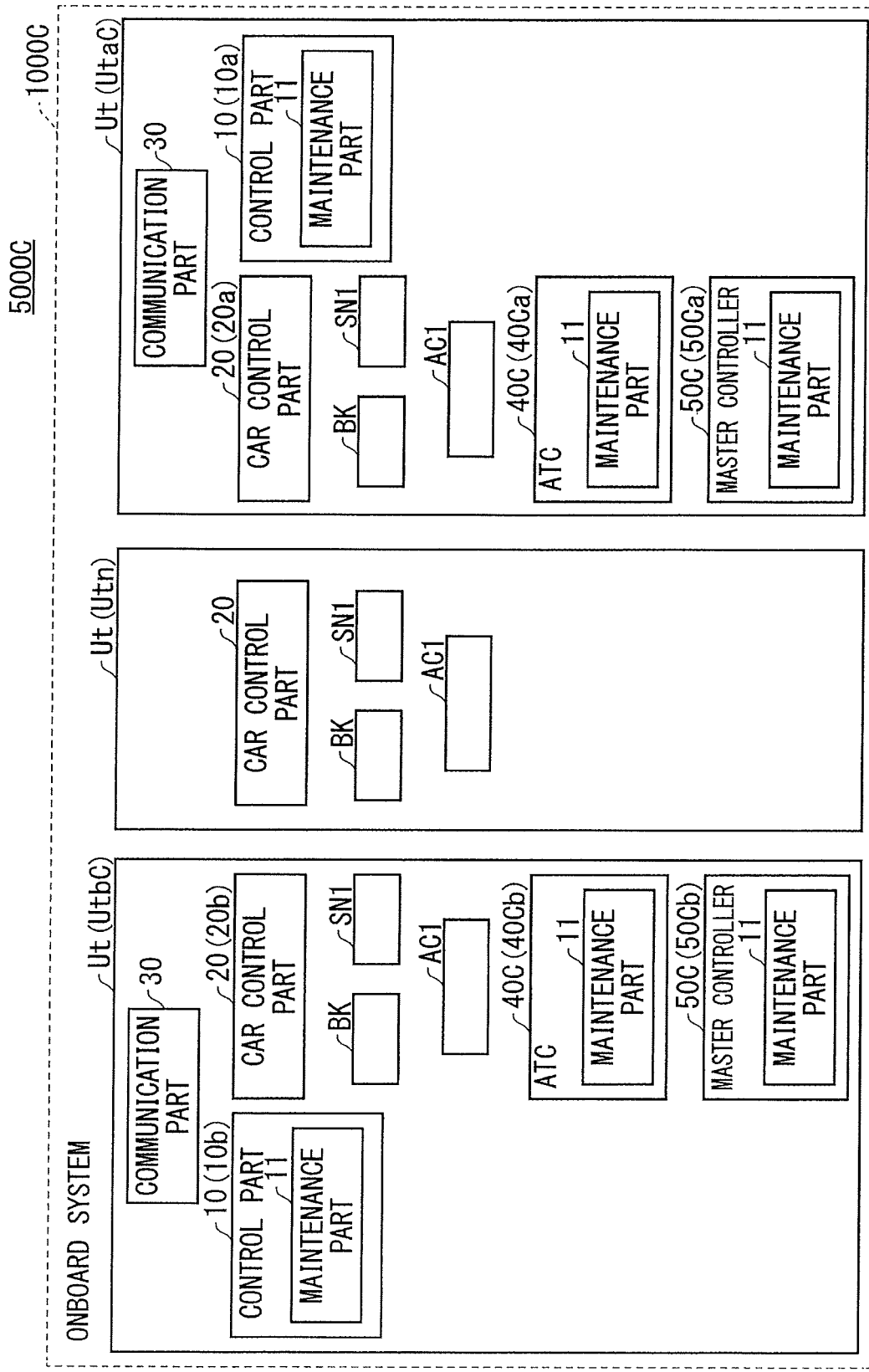
FIG. 13 is a block diagram showing the configuration of a maintenance system according to a fourth embodiment of the present invention.

FIG. 13 is a block diagram showing the configuration of the maintenance system 5000C according to a fourth embodiment of the present invention. Note that, in order to simplify the illustration, FIG. 13 just shows the onboard system 1000C included in the maintenance system 5000C.

With reference to FIG. 13, the onboard system 1000C is different from the onboard system 1000 shown in FIG. 2 in including a control unit UtaC in place of the control unit Uta, and a control unit UtbC in place of the control unit Utb. The rest of the configuration and function of the onboard system 1000C is similar to those of the onboard system 1000 and, therefore, a detailed description thereof is not repeated.

Similarly to the first embodiment, the onboard system 1000C performs various types of processes described in the first embodiment. The various types of processes are, for example, the representative value specify process, the data transmission preparation process, the ground-destined transmission process, the deterioration diagnosis process and the like.

The control unit UtaC is different from the control unit Uta shown in FIG. 2 in including an ATC 40C in place of the ATC 40, and a master controller 50C in place of the master controller 50. The rest of the configuration and function of the control unit UtaC is similar to those of the control unit Uta and, therefore, a detailed description thereof is not repeated. The configuration and function of the control part 10 (10a) included in the control unit UtaC are similar to those of the control part 10 (10a) of the control unit Uta.

The control unit UtbC is different from the control unit Utb shown in FIG. 2 in including an ATC 40C in place of the ATC 40, and a master controller 50C in place of the master controller 50. The rest of the configuration and function of the control unit UtbC is similar to those of the control unit Utb and, therefore, a detailed description thereof is not repeated. The configuration and function of the control part 10 (10b) included in the control unit UtbC are similar to those of the control part 10 (10b) of the control unit Utb.

The ATC 40C included in each of the control units UtaC, UtbC is different from the ATC 40 shown in FIG. 2 in including the maintenance part 11. The rest of the configuration and function of the ATC 40C is similar to those of the ATC 40 an, therefore, a detailed description thereof is not repeated. The maintenance part 11 is, for example, a program module executed by the ATC 40C. Note that, the maintenance part 11 may be configured by dedicated hardware. The maintenance part 11 has the function of performing the maintenance process MtPr.

Since the ATC 40C includes the maintenance part 11, the ATC 40C is the apparatus that has the function of performing the above-described process AtPr and maintenance process MtPr. The process AtPr is the process that the ATC 40C normally performs.

The ATC 40C has, as the operation modes, the normal mode and the standby mode. The normal mode in the ATC 40C is the mode for performing the process AtPr. The standby mode in the ATC 40C is the mode where the performing the process AtPr is not permitted.

The master controller 50C included in each of the control units UtaC, UtbC is different from the master controller 50 shown in FIG. 2 in including the maintenance part 11. The rest of the configuration and function of the master controller 50C is similar to those of the master controller 50 and, therefore, a detailed description thereof is not repeated.

Since the master controller 50C includes the maintenance part 11, the master controller 50C is the apparatus that has the function of performing the above-described process SpPr and maintenance process MtPr. The process SpPr is the process that the master controller 50C normally performs.

The master controller 50C has, as the operation modes, the normal mode and the standby mode. The normal mode in the master controller 50C is the mode for performing the process SpPr. The standby mode in the master controller 50 is the mode where the performing the process SpPr is not permitted.

The control unit UtaC is provided at the car C1a corresponding to the end Eda of the transport vehicle C10. That is, the control unit UtaC is provided at the end Eda of the transport vehicle C10. Therefore, the control part 10 (10a), the ATC 40C, and the master controller 50C each included in the control unit UtaC are provided at the end Eda.

The control unit Utb is provided at the car C1b corresponding to the end Edb of the transport vehicle C10. That is, the control unit UtbC is provided at the end Edb of the transport vehicle C10. Therefore, the control part 10 (10b), the ATC 40C, and the master controller 50C included in the control unit UtbC are provided at the end Edb.

Thus, the onboard system 1000C includes the control parts 10a, 10b, the two ATCs 40C, and the two master controllers 50C. The two ATCs 40C are respectively set to different operation modes. Further, the two master controllers 50C are respectively set to different operation modes.

Hereinafter, the ATC 40C included in the control unit UtaC is referred to also as the "ATC 40Ca". Further, hereinafter, the ATC 40C included in the control unit UtbC is referred to also as the "ATC 40Cb". Still further, hereinafter, the master controller 50C included in the control unit UtaC is referred to also as the "master controller 50Ca". Still further, hereinafter, the master controller 50C included in the control unit UtbC is referred to also as the "master controller 50Cb".

When the operation mode of the ATC 40Ca is the normal mode, the operation mode of the ATC 40Cb is the standby mode. Further, when the operation mode of the ATC 40Cb is the normal mode, the operation mode of the ATC 40Ca is the standby mode.

When the operation mode of the master controller 50Ca is the normal mode, the operation mode of the master controller 50Cb is the standby mode. Further, when the operation mode of the master controller 50Cb is the normal mode, the operation mode of the master controller 50Ca is the standby mode.

In the onboard system 1000C, the apparatus whose operation mode is the standby mode performs the maintenance process MtPr. For example, one of the ATC 40Ca and the ATC 40Cb whose operation mode is the standby mode performs the maintenance process MtPr. Further, for example, one of the master controller 50Ca and the master controller 50Cb whose operation mode is the standby mode performs the maintenance process MtPr.

This configuration increases the volume of the maintenance process that can be executed.

Further, the process that each of the control parts 10a, 10b, the ATCs 40Ca, 40Cb and the master controllers 50Ca, 50Cb performs is set by a predetermined process execution rule Ru1C.

Similarly to the onboard system 1000, the onboard system 1000C has a plurality of types of process modes. Hereinafter, the process AtPr is simply referred to also as the "AtPr". Further, hereinafter, the process SpPr is simply referred to also as the "SpPr".

FIG. 14 shows an exemplary process allocation table TB1C showing the process execution rule Ru1C. With reference to FIG. 14, the process allocation table TB1C shows process modes K, L, M, N.

For example, in the process mode K, it is defined that the control part to perform the process MVPr is the control part 10a. Further, in the process mode K, it is defined that the control part to perform the maintenance process MtPr is the control part 10b.

Further, in the process mode K, it is defined that the ATC to perform the process AtPr is the ATC 40Ca. Note that, the operation mode of the ATC 40Ca that performs the process AtPr is the normal mode. Further, in the process mode K, it is defined that the ATC to perform the maintenance process MtPr is the ATC 40Cb. Note that, the operation mode of the ATC 40Cb performing the maintenance process MtPr is the standby mode.

Further, in the process mode K, it is defined that the master controller to perform the process SpPr is the master controller 50Ca. Note that, the operation mode of the master controller 50Ca performing the process SpPr is the normal mode. Further, in the process mode K, it is determined that the master controller to perform the maintenance process MtPr is the master controller 50Cb. Note that, the operation mode of the master controller 50Cb performing the maintenance process MtPr is the standby mode.

For example, in the onboard system 1000C in the process mode K, the control part 10a (the main control part Mc) performs the process MVPr, and the control part 10b performs the maintenance process MtPr. Further, in the onboard system 1000C in the process mode K, the ATC 40Ca performs the process AtPr, and the ATC 40Cb performs the maintenance process MtPr. Still further, in the onboard system 1000C in the process mode K, the master controller 50Ca performs the process SpPr, and the master controller 50Cb performs the maintenance process MtPr.

Further, similarly to the onboard system 1000, the process mode of the onboard system 1000C changes in accordance with a change in the travel state of the transport vehicle C10. Here, it is assumed that the process mode of the onboard system 1000C has changed from the process mode K to the process mode L.

In this case, the onboard system 1000C switches, over the ATC 40Ca and the ATC 40Cb, between the apparatus to perform the process AtPr and the apparatus to perform the maintenance process MtPr. Further, when the process mode has changed from the process mode K to the process mode L, the onboard system 1000C switches, over the master controller 50Ca and the master controller 50Cb, between the apparatus to perform the process SpPr and the apparatus to perform the maintenance process MtPr.

Specifically, when the process mode of the onboard system 1000C has changed from the process mode K to the process mode L: the ATC 40Ca performs the maintenance process MtPr; the ATC 40Cb performs the process AtPr; the master controller 50Ca performs the maintenance process MtPr; and the master controller 50Cb performs the process SpPr. That is, in the onboard system 1000C, the ATCs in the standby mode and the master controllers in the standby mode perform a plurality of types of maintenance processes MtPr in a distributed manner.

As has been described above, according to the present embodiment, in the onboard system 1000C, the ATCs in the standby mode and the master controllers in the standby mode perform a plurality of types of maintenance processes MtPr in a distributed manner. Therefore, while avoiding any influence on the process MVPr for controlling the travel of the transport vehicle C10, the maintenance process MtPr can be efficiently performed. Note that, the present embodiment also exhibits the effect similar to that the first embodiment exhibits.

Fifth Embodiment

The configuration of the present embodiment is the configuration of processing data based on the priority which is used when a prescribed condition is satisfied (hereinafter referred to also as the "configuration CtD"). The maintenance system in the configuration CtD is the maintenance system 5000 shown in FIG. 1. Accordingly, the maintenance system 5000 in the configuration CtD includes the onboard system 1000 and the ground system 2000 according to the first embodiment.

The configuration and function of the onboard system 1000 in the configuration CtD are similar to those of the onboard system 1000 according to the first embodiment and, therefore, a detailed description thereof is not repeated.

Similarly to the first embodiment, the onboard system 1000 in the configuration CtD performs various types of processes described in the first embodiment. The various types of processes are, for example, the representative value specify process, the data transmission preparation process, the ground-destined transmission process, the deterioration diagnosis process and the like.

That is, the onboard system 1000 (the control part 10) in the configuration CtD performs the maintenance process MtPr similarly to the first embodiment. The maintenance process MtPr is the process of handling a plurality of types of state data StD. The plurality of types of state data StD are, for example, the above-described state data StDp, the state data StDt and the like.

Hereinafter, the representative value specify process shown in FIG. 6 to which the configuration CtD is applied is referred to also as the "representative value specify process D". Note that, the representative value specify process D is the maintenance process MtPr.

In the following, a description will be given of mainly a process different from that in the first embodiment. The representative value specify process D is different from the representative value specify process shown in FIG. 6 in that the following representative value rule table TB2D is used in place of the representative value rule table TB2 shown in FIG. 4.

FIG. 15 shows an exemplary representative value rule table TB2D according to a fifth embodiment of the present invention. With reference to FIG. 15, the representative value rule table TB2D is different from the representative value rule table TB2 in further including the item "condition Cd" and the item "condition priority". The rest of the configuration of the representative value rule table TB2D is similar to those of the representative value rule table TB2 and, therefore, a detailed description thereof is not repeated.

Each of the "condition CdB" and the "condition CdA" shown under the "condition Cd" is the condition relating to the state of the transport vehicle C10. The "condition CdB" is, for example, the condition that a failure of the brake BK of at least one car C1 has occurred in the transport vehicle C10. The "condition CdA" is, for example, the condition that a failure of the air conditioning apparatus AC1 of at least one car C1 has occurred in the transport vehicle C10.

The "condition priority" is the priority that is used when the corresponding condition Cd is satisfied. As the value of the "condition priority" is smaller, the state data StD corresponding to the "condition priority" has a higher processing priority. Therefore, as the value of the "condition priority" is smaller, the state data StD corresponding to that "condition priority" is processed with a higher priority.

The representative value rule table TB2D shows that, provided that both the condition CdB and the condition CdA are satisfied, the state data StDp is processed with a higher priority than the state data StDt.

Note that, in the representative value rule table TB2D, with the state data StDp, the condition CdB and the condition priority "1" are associated. In the representative value rule table TB2D, with the state data StDt, the condition CdA and the condition priority "2" are associated. When the condition CdB is satisfied, the condition priority "1" is used. Further, when the condition CdA is satisfied, the condition priority "2" is used.

Next, a description will be given of the representative value specify process D. In the normal case where both of the conditions CdB, CdA are not satisfied, in the representative value specify process D, similarly to the first embodiment, the processes from Steps S110 to S160 are performed using the representative value rule table TB2D shown in FIG. 15.

Here, the following precondition Pr4 is discussed. In the precondition Pr4, in the transport vehicle C10, a failure of the air conditioning apparatus AC1 of at least one car C1 has occurred. That is, in the precondition Pr4, the condition CdA associated with the state data StDt is satisfied.

Further, in the precondition Pr4, in the data acquisition process in Step S110, as an example, the standby control part Wc acquires, over 10 seconds, 21 pieces of state data StD. Further, in the precondition Pr4, as an example, the 21 pieces of state data StD includes 20 pieces of state data StDp and one piece of state data StDt.

In the representative value specify process D in the precondition Pr4, similarly to the first embodiment, the processes in Steps S110, S120 are performed. Thus, the 21 pieces of state data StD are selected.

Next, in the prioritized data selection process in Step S130 in precondition Pr4, since the condition CdA is satisfied, the standby control part Wc uses the condition priority "2". Specifically, the standby control part Wc selects, according to the condition priority "2", one piece of state data StDt having the highest priority out of the selected 21 pieces of state data StD.

Next, in the representative value calculation process in Step S140 in the precondition Pr4, the standby control part Wc calculates the maximum value of the value of one piece of indoor temperature Tmp represented by the one piece of state data StDt as the representative value. Thus, the representative value is specified.

Then, similarly to the first embodiment, the processes of Steps S150, S160 are performed.

Thus, in the representative value specify process D (the maintenance process MtPr) in the precondition Pr4, when the condition CdA associated with the state data StDt is satisfied, the state data StDt is processed according to the condition priority "2" which is associated with the state data StDt. That is, in the configuration CtD, when the condition Cd associated with the state data StDt is satisfied, the state data StDt is processed according to the condition priority with which the state data StDt is associated.

Note that, depending on the value of each of the priority and the condition priority shown in the representative value rule table TB2D, in some cases, the priority and the condition priority may coincide with each other. In this case, the data corresponding to the condition priority is processed with a higher priority.

As has been described above, in the present embodiment, using the condition Cd and the condition priority, upon a failure of the apparatus and the like, the related data can be processed with a higher priority. Further, using the condition Cd and the condition priority, the priority (the order) of processing the state data StDt can be set according to the state of the transport vehicle.

First Variation

Note that, the configuration CtC according to the fourth embodiment may be applied to the configuration CtA of the second embodiment. Hereinafter, the configuration in which the configuration CtC is applied to the configuration CtA is referred to also as the "configuration CtAc". Hereinafter, the maintenance system to which the configuration CtAc is applied is referred to also as the "maintenance system 5000Ac". Further, hereinafter, the onboard system to which the configuration CtAc is applied is referred to also as the "onboard system 1000Ac".

Further, hereinafter, the control unit Uta to which the configuration CtAc is applied is referred to also as the "control unit UtaAc". Further, hereinafter, the control unit Utb to which the configuration CtAc is applied is referred to also as the "control unit UtbAc".

The maintenance system 5000Ac is different from the maintenance system 5000 shown in FIG. 1 in including the onboard system 1000Ac in place of the onboard system 1000. The rest of the configuration and function of the maintenance system 5000Ac is similar to those of the maintenance system 5000 and, therefore, a detailed description thereof is not repeated. The onboard system 1000Ac is provided at the transport vehicle C10 shown in FIG. 1.

Figure 16:
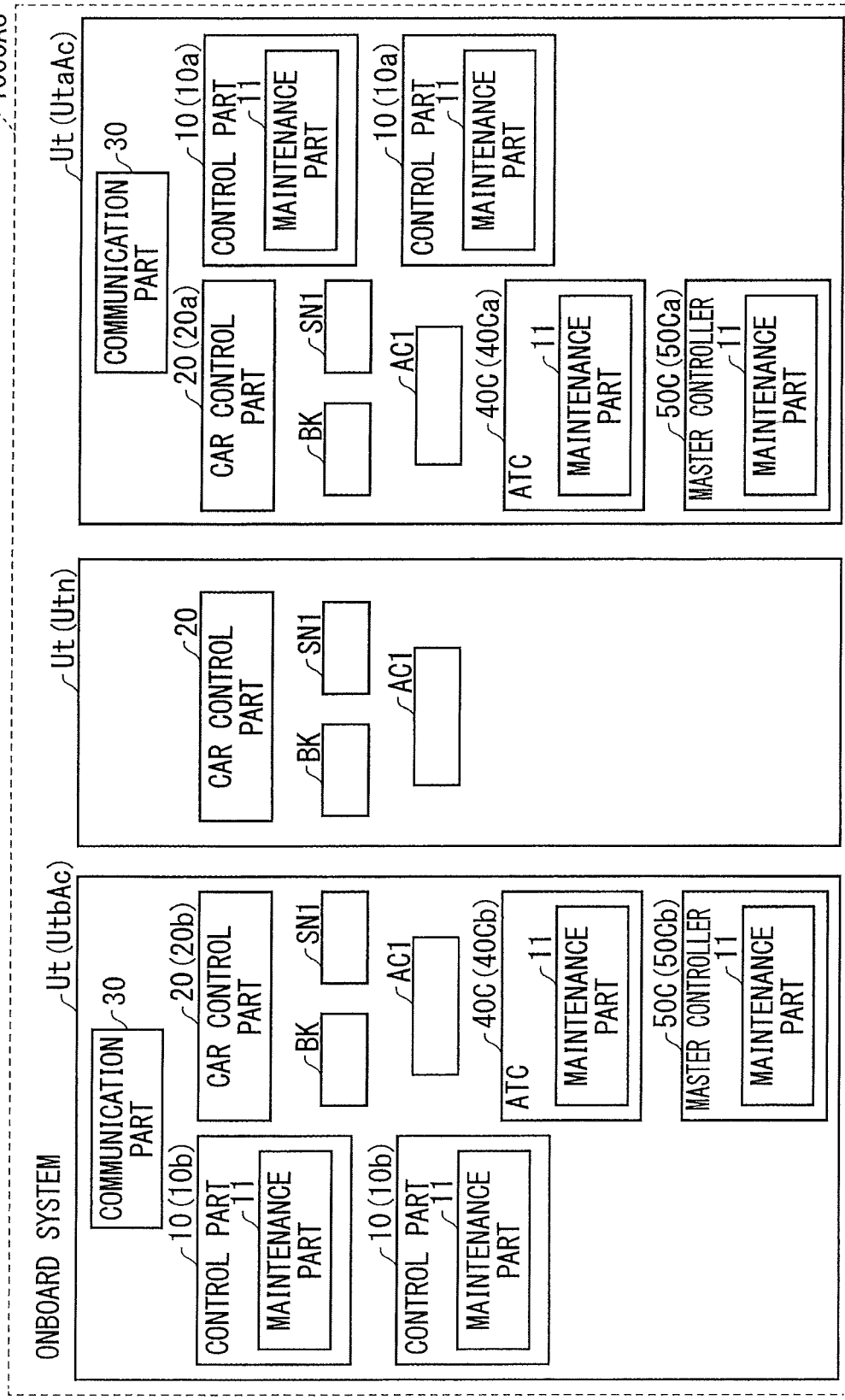
FIG. 16 is a block diagram showing the configuration of a maintenance system according to a first variation.

FIG. 16 is a block diagram showing the configuration of the maintenance system 5000Ac according to the first variation. Note that, in order to simplify the illustration, FIG. 16 shows just the onboard system 1000Ac included in the maintenance system 5000Ac.

With reference to FIG. 16, the onboard system 1000Ac is different from the onboard system 1000A shown in FIG. 8 in including a control unit UtaAc in place of the control unit UtaA, and a control unit UtbAc in place of the control unit UtbA. The rest of the configuration and function of the onboard system 1000Ac is similar to those of the onboard system 1000A and, therefore, a detailed description thereof is not repeated.

The control unit UtaAc is different from the control unit UtaA shown in FIG. 8 in including an ATC 40C in place of the ATC 40, and a master controller 50C in place of the master controller 50. The rest of the configuration and function of the control unit UtaAc is similar to those of the control unit UtaA and, therefore, a detailed description thereof is not repeated. The configuration and function of the control part 10 (10a) included in the control unit UtaAc are similar to those of the control part 10 (10a) of the control unit UtaA.

The control unit UtbAc is different from the control unit UtbA shown in FIG. 8 in including an ATC 40C in place of the ATC 40, and a master controller 50C in place of the master controller 50. The rest of the configuration and function of the control unit UtbAc is similar to those of the control unit UtbA and, therefore, a detailed description thereof is not repeated. The configuration and function of the control part 10 (10b) included in the control unit UtbAc are similar to those of the control part 10 (10b) of the control unit UtbA.

The control unit UtaAc is provided at the car C1a corresponding to the end Eda of the transport vehicle C10. That is, the control unit UtaAc is provided at the end Eda of the transport vehicle C10. Therefore, the two control parts 10 (10a), the ATC 40C, and the master controller 50C included in the control unit UtaAc is provided at the end Eda.

The control unit UtbAc is provided at the car C1b corresponding to the end Edb of the transport vehicle C10. That is, the control unit UtbAc is provided at the end Edb of the transport vehicle C10. Therefore, the two control parts 10 (10b), the ATC 40C, and the master controller 50C included in the control unit UtbAc are provided at the end Edb.

Thus, the onboard system 1000Ac includes four control parts 10, two ATCs 40C, and two master controllers 50C. The four control parts 10 are formed by two control parts 10 (10a) provided at the end Eda (the car C1a) and two control parts 10 (10b) provided at the end Edb (the car C1b).

Hereinafter, the ATC 40C included in the control unit UtaAc is referred to also as the "ATC 40Ca". Further, hereinafter, the ATC 40C included in the control unit UtbAc is referred to also as the "ATC 40Cb". Still further, hereinafter, the master controller 50C included in the control unit UtaAc is referred to also as the "master controller 50Ca". Still further, hereinafter, the master controller 50C included in the control unit UtbAc is referred to also as the "master controller 50Cb".

In the configuration CtAc, similarly to the second embodiment, the four control parts 10 operate, for example, according to the process allocation table TB1A shown in FIG. 9. That is, in the four control parts 10, one control part 10 operates as the backup control part Bc, and two control parts 10 perform the maintenance process MtPr.

Further, similarly to the second embodiment, in the configuration CtAc, the onboard system 1000Ac changes the process mode of the onboard system 1000Ac, thereby switching, over the four control parts 10, between the control part to perform the process MVPr and the control part to perform the maintenance process MtPr.

Further, in the configuration CtAc, similarly to the fourth embodiment, the ATCs 40Ca, 40Cb and the master controllers 50Ca, 50Cb operate, for example, according to the process allocation table TB1C shown in FIG. 14. Therefore, one of the ATC 40Ca and the ATC 40Cb whose operation mode is the standby mode performs the maintenance process MtPr. Further, for example, one of the master controller 50Ca and the master controller 50Cb whose operation mode is the standby mode performs the maintenance process MtPr.

Further, in the configuration CtAc, similarly to the fourth embodiment, the onboard system 1000Ac switches, over the ATC 40Ca and the ATC 40Cb, between the apparatus to perform the process AtPr and the apparatus to perform the maintenance process MtPr. Still further, similarly to the fourth embodiment, the onboard system 1000Ac switches, over the master controller 50Ca and the master controller 50Cb, between the apparatus to perform the process SpPr and the apparatus to perform the maintenance process MtPr.

Second Variation

Note that, the configuration CtC according to the fourth embodiment may be applied to the configuration CtAx according to the second embodiment. Hereinafter, the configuration in which the configuration CtC is applied to the configuration CtAx is referred to also as the "configuration CtAxc". The maintenance system in the configuration CtAxc is the maintenance system 5000Ac shown in FIG. 16. The maintenance system 5000Ac includes the onboard system 1000Ac shown in FIG. 16.

Similarly to the configuration CtAx, the onboard system 1000Ac in the configuration CtAxc operates according to the process allocation table TB1AX shown in FIG. 10.

The four control parts 10 included in the onboard system 1000Ac according to the process allocation table TB1AX are formed by: one control part 10 (the main control part Mc) that performs the process MVPr; two control parts 10 to perform the process MVPr upon a failure of the main control part Mc; and one control part 10 that performs the maintenance process MtPr in a period during which the main control part Mc is performing the process MVPr.

Further, similarly to the second embodiment, in the configuration CtAxc, the onboard system 1000Ac changes the process mode of the onboard system 1000Ac thereby switching, over the four control parts 10, between the control part to perform the process MVPr and the control part to perform the maintenance process MtPr.

Further, similarly to the fourth embodiment, in the configuration CtAxc, the ATCs 40Ca, 40Cb and the master controllers 50Ca, 50Cb operate, for example, according to the process allocation table TB1C shown in FIG. 14. Therefore, one of the ATC 40Ca and the ATC 40Cb whose operation mode is the standby mode performs the maintenance process MtPr. Further, for example, one of the master controller 50Ca and the master controller 50Cb whose operation mode is the standby mode performs the maintenance process MtPr.

Further, similarly to the fourth embodiment, in the configuration CtAxc, the onboard system 1000Ac switches, over the ATC 40Ca and the ATC 40Cb, between the apparatus to perform the process AtPr and the apparatus to perform the maintenance process MtPr. Still further, similarly to the fourth embodiment, the onboard system 1000Ac switches, over the master controller 50Ca and the master controller 50Cb, between the apparatus to perform the process SpPr and the apparatus to perform the maintenance process MtPr.

Third Variation

Note that, the configuration CtC according to the fourth embodiment may be applied to the configuration CtB according to the third embodiment. Hereinafter, the configuration in which the configuration CtC is applied to the configuration CtB is referred to also as the "configuration CtBc". Hereinafter, the maintenance system to which the configuration CtBc is applied is referred to also as the "maintenance system 5000Bc".

Further, hereinafter, the control unit Uta to which the configuration CtBc is applied is referred to also as the "control unit UtaBc". Further, hereinafter, the control unit Utb to which the configuration CtBc is applied is referred to also as the "control unit UtbBc".

The maintenance system 5000Bc is different from the maintenance system 5000B shown in FIG. 11 in including an onboard system 1000Bc in place of the onboard system 1000B. The rest of the configuration and function of the maintenance system 5000Bc is similar to those of the maintenance system 5000B and, therefore, a detailed description thereof is not repeated. The onboard system 1000Bc is provided at the transport vehicle C10B shown in FIG. 11.

Figure 17:
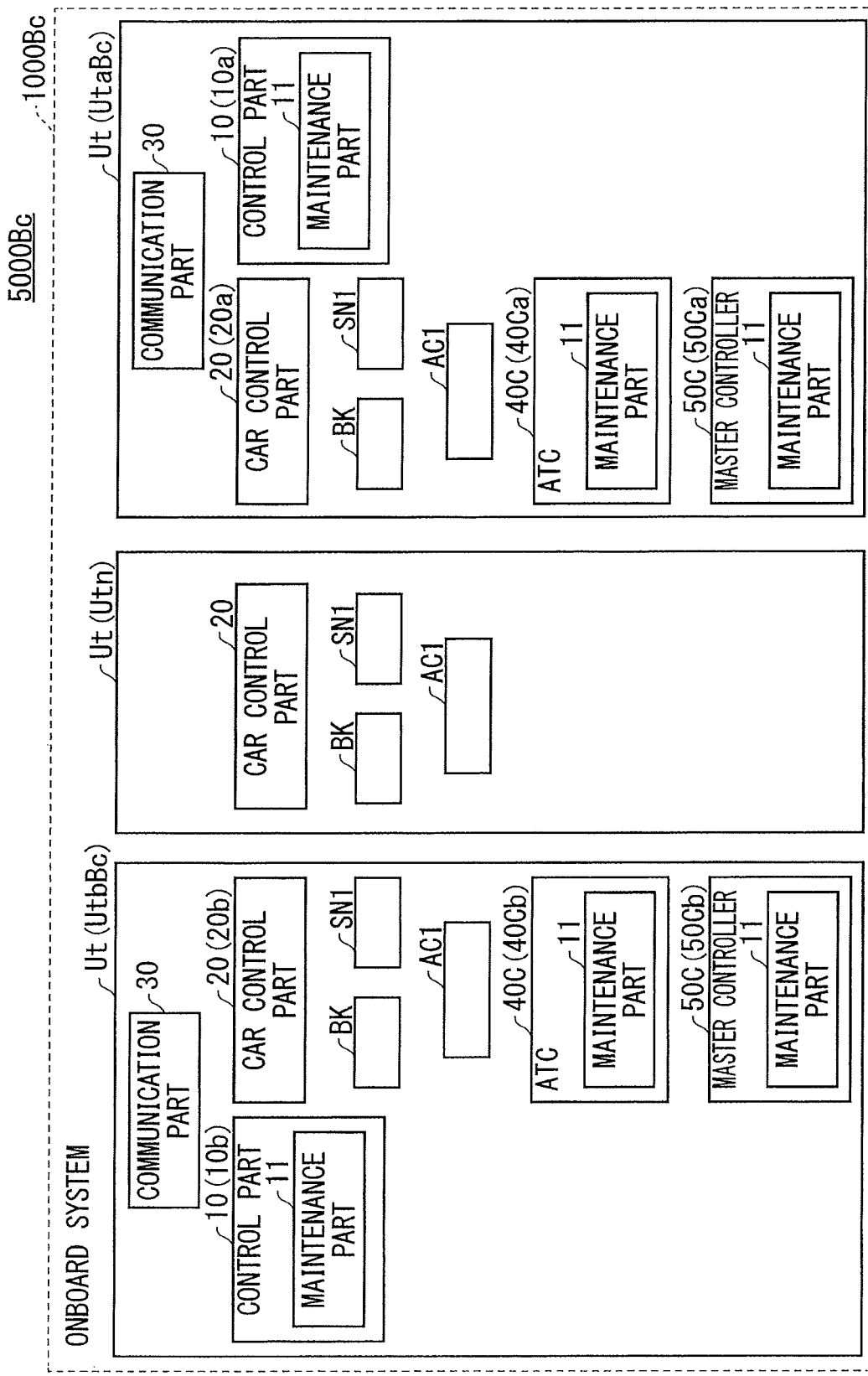
FIG. 17 is a block diagram showing the configuration of a maintenance system according to a third variation.

FIG. 17 is a block diagram showing the configuration of the maintenance system 5000Bc according to the third variation. Note that, in order to simplify the illustration, FIG. 17 shows just the onboard system 1000Bc included in the maintenance system 5000Bc.

With reference to FIG. 17, the onboard system 1000Bc is different from the onboard system 1000B shown in FIG. 12 in including a control unit UtaBc in place of the control unit Uta, and a control unit UtbBc in place of the control unit Utb. The rest of the configuration and function of the onboard system 1000Bc is similar to those of the onboard system 1000B and, therefore, a detailed description thereof is not repeated.

The control unit UtaBc is different from the control unit Uta shown in FIG. 12 in including an ATC 40C in place of the ATC 40, and a master controller 50C in place of the master controller 50. The rest of the configuration and function of the control unit UtaBc is similar to those of the control unit Uta and, therefore, a detailed description thereof is not repeated. The configuration and function of the control part 10 (10a) included in the control unit UtaBc are similar those of the control part 10 (10a) of the control unit Uta.

The control unit UtbBc is different from the control unit Utb shown in FIG. 12 in including an ATC 40C in place of the ATC 40, and a master controller 50C in place of the master controller 50. The rest of the configuration and function of the control unit UtbBc is similar to those of the control unit Utb and, therefore, a detailed description thereof is not repeated. The configuration and function of the control part 10 (10b) included in the control unit UtbBc are similar to those of the control part 10 (10b) of the control unit Utb.

The control unit UtaBc is provided at the car C1a corresponding to the end Eda of each unit train C5. That is, the control unit UtaBc is provided at the end Eda of each unit train C5. Therefore, the control part 10 (10a), the ATC 40C, and the master controller 50C included in the control unit UtaBc are provided at the end Eda of each unit train C5.

The control unit UtbBc is provided at the car C1b corresponding to the end Edb of each unit train C5. That is, the control unit UtbBc is provided at the end Edb of each unit train C5. Therefore, the control part 10 (10b), the ATC 40C, and the master controller 50C included in the control unit UtbBc are provided at the end Edb of each unit train C5.

In the configuration CtBc, as an example, the transport vehicle C10B is formed by two unit trains C5. Therefore, the onboard system 1000Bc includes four control parts 10, two ATCs 40C, and two master controllers 50C. The four control parts 10 are formed by two control parts 10a and two control parts 10b. At the unit train C5a, the control parts 10a, 10b are provided. At the unit train C5b, the control parts 10a, 10b are provided.

Further, similarly to the third embodiment, in the configuration CtBc, the coupling release process and the data external transmission process are performed.

Here, the following precondition Pr3B is discussed. In the precondition Pr3B, the transport vehicle C10B (k-pieces of unit trains C5) includes a unit train C5a and a unit train C5b coupled to each other. Hereinafter, each of the control units UtaBc, UtbBc provided at the unit train C5a is referred to also as the "control unit UtCa". Further, hereinafter, each of the control units UtaBc, UtbBc provided at each of the unit train C5b is referred to also as the "control unit UtCb".

Further, in the precondition Pr3B, the control part 10 of the control unit UtCa provided at the unit train C5a retains the state data StD that represents the state of the unit train C5b. Further, in the precondition Pr3B, in the coupling release process, the coupling between the unit train C5a and the unit train C5b is released.

In the data external transmission process in the precondition Pr3B, the control unit UtCa (the control part 10) provided at the unit train C5a transmits the state data StD to the control unit UtCb (the unit train C5b) when the coupling between the unit train C5a and the unit train C5b is released. This configuration exhibits the effect similar to that the third embodiment exhibits.

Hereinafter, the ATC 40C included in the control unit UtaBc is referred to also as the "ATC 40Ca". Further, hereinafter, the ATC 40C included in the control unit UtbBc is referred to also as the "ATC 40Cb". Still further, hereinafter, the master controller 50C included in the control unit UtaBc is referred to also as the "master controller 50Ca". Still further, hereinafter, the master controller 50C included in the control unit UtbBc is referred to also as the "master controller 50Cb".

Further, in the configuration CtBc, similarly to the fourth embodiment, the ATCs 40Ca, 40Cb and the master controllers 50Ca, 50Cb operate, for example, according to the process allocation table TB1C shown in FIG. 14. Therefore, one of the ATC 40Ca and the ATC 40Cb whose operation mode is the standby mode performs the maintenance process MtPr. Further, for example, one of the master controller 50Ca and the master controller 50Cb whose operation mode is the standby mode performs the maintenance process MtPr.

Further, in the configuration CtBc, similarly to the fourth embodiment, the onboard system 1000Bc switches, over the ATC 40Ca and the ATC 40Cb, between the apparatus to perform the process AtPr and the apparatus to perform the maintenance process MtPr. Further, similarly to the fourth embodiment, the onboard system 1000Bc switches, over the master controller 50Ca and the master controller 50Cb, between the apparatus to perform the process SpPr and the apparatus to perform the maintenance process MtPr.

Fourth Variation

Note that, the configuration CtD according to the fifth embodiment may be applied to the configuration CtA of the second embodiment. Hereinafter, the configuration in which the configuration CtD is applied to the configuration CtA is referred to also as the "configuration CtAd". In the configuration CtAd, similarly to the fifth embodiment, in the onboard system 1000A in the configuration CtA, the representative value specify process D (the maintenance process MtPr) using the condition Cd and the condition priority is performed.

In the representative value specify process D using the condition Cd and the condition priority in the configuration CtAd, when condition Cd associated with the state data StDt is satisfied, the state data StDt is processed according to the condition priority associated with the state data StDt.

Further, the configuration CtD according to the fifth embodiment may be applied to the configuration CtB according to the third embodiment. Hereinafter, the configuration in which the configuration CtD is applied to the configuration CtB is referred to also as the "configuration CtBd". In the configuration CtBd, similarly to the fifth embodiment, in the onboard system 1000B in the configuration CtB, the representative value specify process D (the maintenance process MtPr) using the condition Cd and the condition priority is performed.

Further, the configuration CtD according to the fifth embodiment may be applied the configuration CtC according to the fourth embodiment. Hereinafter, the configuration in which the configuration CtD is applied to the configuration CtC is referred to also as the "configuration CtCd". In the configuration CtCd, in the onboard system 1000C in the configuration CtC, similarly to the fifth embodiment, the representative value specify process D (the maintenance process MtPr) using the condition Cd and the condition priority is performed.

Note that, the configuration CtD according to the fifth embodiment may be applied to the configuration CtAc of the first variation. Hereinafter, the configuration in which the configuration CtD is applied to the configuration CtAc is referred to also as the "configuration CtAcd". In the configuration CtAcd, similarly to the fifth embodiment, in the onboard system 1000Ac in the configuration CtAc, the representative value specify process D (the maintenance process MtPr) using the condition Cd and the condition priority is performed.

Further, the configuration CtD according to the fifth embodiment may be applied to the configuration CtAxc according to the second variation. Hereinafter, the configuration in which the configuration CtD is applied to the configuration CtAxc is referred to also as the "configuration CtAxcd". In the configuration CtAxcd, similarly to the fifth embodiment, in the onboard system 1000Ac in the configuration CtAxc, the representative value specify process D (the maintenance process MtPr) using the condition Cd and the condition priority is performed.

Further, the configuration CtD according to the fifth embodiment may be applied to the configuration CtBc according to the third variation. Hereinafter, the configuration in which the configuration CtD is applied to the configuration CtBc is referred to also as the "configuration CtBcd". In the configuration CtBcd, similarly to the fifth embodiment, in the onboard system 1000Bc in the configuration CtBc, the representative value specify process D (the maintenance process MtPr) using the condition Cd and the condition priority is performed.

Functional Block Diagram

Figure 18:
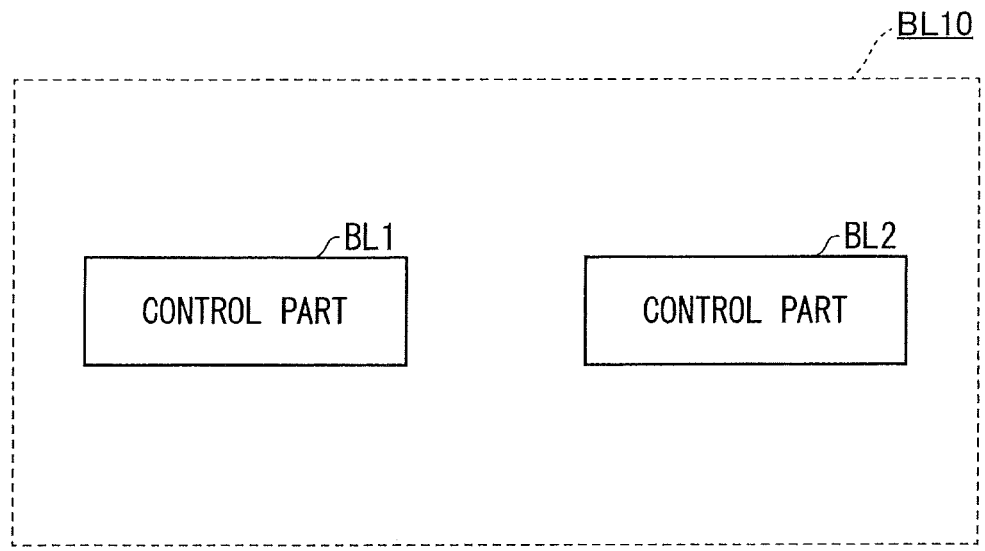
FIG. 18 is a block diagram showing the characteristic functional configuration of the onboard system.

FIG. 18 is a block diagram showing the characteristic functional configuration of the onboard system BL10. The onboard system BL10 corresponds to one of the onboard systems 1000, 1000A, 1000B, 1000C, 1000Ac, 1000Bc. That is, FIG. 18 is a block diagram that shows, out of the functions of the onboard system BL10, the main functions relating to the present invention.

The onboard system BL10 is provided at an elongated transport vehicle that travels along a previously provided route.

The onboard system BL10 functionally includes control parts BL1, BL2. The control part BL1 corresponds to the control part 10a. The control part BL2 corresponds to the control part 10b. Each of the control parts BL1, BL2 has the function of performing the first process for controlling the travel of the transport vehicle.

The control part BL1 is provided at the first end being one end of the transport vehicle. The control part BL2 is provided at the second end being the other end of the transport vehicle. In a period during which the control part BL1 is performing the first process, the control part BL2 does not perform the first process.

The control part BL2 performs the maintenance process for performing the maintenance of the transport vehicle in the period during which the control part BL1 is performing the first process.

Figure 19:
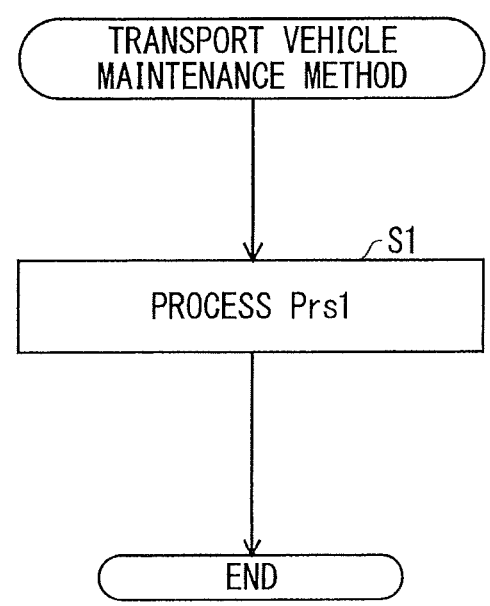
FIG. 19 is a flowchart of a transport vehicle maintenance method.

Further, the onboard system BL10 performs the following transport vehicle maintenance method. FIG. 19 is a flowchart of the transport vehicle maintenance method.

The transport vehicle maintenance method includes Step S1. In Step S1, a process Prs1 is performed. In the process Prs1, in a period during which the control part BL1 is performing the first process, the control part BL2 performs the maintenance process for performing the maintenance of the transport vehicle.

Other Variation

In the foregoing, while the onboard system of the present invention has been described based on the embodiments, the present invention is not limited to the embodiments. Within the range not departing from the gist of the present invention, the present invention includes any variations of the embodiments that the person skilled in the art arrives at. That is, within the scope of the invention, the present invention includes any combinations, modifications, and omission of the embodiments and the variations as appropriate.

Hereinafter, the onboard system according to the present invention is referred to also as the "onboard system hzs". The onboard system hzs is one of the onboard systems 1000, 1000A, 1000B, 1000C, 1000Ac, 1000Bc.

Further, the onboard system hzs may not include all the constituents shown in the drawings. That is, the onboard system hzs should include the minimum constituents with which the effect of the present invention is exhibited. For example, the control unit Ut of the onboard system hzs may dispense with the air conditioning apparatus AC1.

Further, the function of each of the control parts 10a, 10b included in the onboard system hzs may be realized by two processing circuits.

One of the two processing circuits performs the maintenance process for performing maintenance of the transport vehicle in a period during which the other one of the processing circuits is performing the first process.

The processing circuits may each be dedicated hardware. Further, the processing circuits may each be a processor that executes a program stored in memory. The processor is, for example, a CPU (Central Processing Unit), a central processing unit, an arithmetic unit, a microprocessor, a microcomputer, a DSP (Digital Signal Processor) and the like.

Hereinafter, the configuration in which the processing circuits are each dedicated hardware is referred to also as the "configuration Cs1". Further, hereinafter, the configuration in which the processing circuits are each a processor is referred to also as the "configuration Cs2".

In the configuration Cs1, the processing circuits are each, for example, a single circuit, a combined circuit, a programmed processor, a parallel-programed processor, an ASIC (Application Specific Integrated Circuit), an FPGA (Field Programmable Gate Array), or a combination of the foregoing.

Note that, the configuration in which all or part of the constituents included in the onboard system hzs is implemented in hardware is, for example, as follows. Hereinafter, the onboard system in which all or part of the constituents included in the onboard system hzs is implemented in hardware is referred to also as the "onboard system hd10".

FIG. 20 is a hardware configuration diagram of the onboard system hd10. With reference to FIG. 20, the onboard system hd10 includes a processor hd1, a processor hd2, and a memory hd3.

The memory hd3 is, for example, volatile or nonvolatile semiconductor memory such as RAM (Random Access Memory), ROM (Read Only Memory), flash memory, EPROM, EEPROM or the like. Further, for example, the memory hd3 is a magnetic disk, a flexible disk, an optical disk, a compact disc, a mini disk, a DVD or the like.

The processor hd1 corresponds to the control part 10a. The processor hd2 corresponds to the control part 10b.

In the configuration Cs2, the processing circuits are the processors hd1, hd2. In the configuration Cs2, the function of each of the control parts 10a, 10b is realized by software, firmware, or a combination of software and firmware. The software or the firmware is described as a program and stored in the memory hd2.

Further, in the configuration Cs2, by the processing circuits (the processors hd1, hd2) reading a program stored in the memory hd2 and executing the program, the function of each of the control parts 10a, 10b is realized. That is, the memory hd2 stores the following program.

The program causes a computer to execute, for example, the procedure of the processes performed by each of the control parts 10a, 10b, the method of executing the processes and the like.

Further, the present invention may be realized as a transport vehicle maintenance method including, as steps, the operations of the characteristic constituents of the onboard system hzs. Further, the present invention may be realized as a program for causing a computer to execute such steps included in the transport vehicle maintenance method. Further, the present invention may be realized as a computer-readable recording medium storing such a program. Further, the program may be distributed via a transmission medium such as the Internet.

Every numerical value used in the above-described embodiments is an exemplary numerical value for specifically describing the present invention. That is, the present invention is not limited to each of the numerical values used in the above-described embodiments.

Note that, within the scope of the invention, the present invention includes any combinations, modifications, and omission of the embodiments and the variations as appropriate.

For example, each of the transport vehicles C10, C10B is not limited to a train. Each of the transport vehicles C10, C10B may be a bus, a streetcar, a monorail or the like.

While the present invention has been described in detail, the foregoing description is illustrative in every respect and does not limit the present invention thereby. It is to be construed that numerous variations which have not been shown can be arrived at without departing from the scope of the present invention.

EXPLANATION OF REFERENCE SIGNS 10, 10a, 10b, BL1, BL2: control part
11: maintenance part
40, 40C, 40Ca, 40Cb: ATC
50, 50C, 50Ca, 50Cb: master controller
1000, 1000A, 1000Ac, 1000B, 1000Bc, 1000C, BL10, hd10: onboard system
5000, 5000A, 5000Ac, 5000B, 5000Bc, 5000C: maintenance system

The invention claimed is:

1. An onboard system provided at a transport vehicle that is elongated and travels along a previously provided route, the onboard system comprising
   u (where u is a natural number of 4 or greater)-pieces of control parts, wherein
   each of the u-pieces of control parts has a function of performing a first process for controlling the travel of the transport vehicle,
   the u-pieces of control parts include:
      a main control part being one control part that performs the first process; and
      three or more control parts excluding the main control part from the u-pieces of control parts,
   each of the three or more control parts does not perform the first process in a period during which the main control part is performing the first process, and
   the three or more control parts perform a plurality of types of maintenance processes for performing maintenance of the transport vehicle in a distributed manner in the period during which the main control part is performing the first process.

2. The onboard system according to claim 1, wherein each of the plurality of types of maintenance processes is a process of handling a plurality of types of data showing a state of the transport vehicle, with each of the plurality of types of data, a condition relating to the state of the transport vehicle and a priority used when the condition is satisfied are associated, and target data being one of the plurality of types of data is processed, when the condition associated with the target data is satisfied, according to the priority associated with the target data.

3. The onboard system according to claim 1, wherein the onboard system has a function of communicating with a ground system provided on a ground, the transport vehicle is formed by k (where k is a natural number of 2 or greater)-pieces of unit trains linearly coupled to each other, and the k-pieces of unit trains includes a first unit train and a second unit train coupled to each other, the onboard system further comprising:

a first control unit provided at the first unit train; and a second control unit provided at the second unit train, wherein the first control unit retains state data representing a state of the second unit train, and the first control unit transmits the state data to one of the ground system and the second control unit when the coupling between the first unit train and the second unit train is released.

4. The onboard system according to claim 1, further comprising:

a first apparatus; and a second apparatus, wherein each of the first apparatus and the second apparatus includes a maintenance part having a function of performing one of the plurality of types of maintenance processes, each of the first apparatus and the second apparatus has, as an operation mode, a normal mode for performing a second process relating to the travel of the transport vehicle, and a standby mode where the performing the second process is not permitted, when the operation mode of the first apparatus is the normal mode, the operation mode of the second apparatus is the standby mode, when the operation mode of the second apparatus is the normal mode, the operation mode of the first apparatus is the standby mode, and one of the first apparatus and the second apparatus whose operation mode is the standby mode performs one of the plurality of types of maintenance processes.

5. The onboard system according to claim 4, wherein the onboard system switches, over the first apparatus and the second apparatus, between an apparatus to perform the second process and an apparatus to perform one of the plurality of types of maintenance processes.

6. A transport vehicle maintenance method performed by an onboard system provided at a transport vehicle that is elongated and travels along a previously provided route, wherein the onboard system includes two u (where u is a natural number of 4 or greater)-pieces of processors, each of the u-pieces of processors has a function of performing a first process for controlling the travel of the transport vehicle, the u-pieces of processors include:

a main processor being one processor that performs the first process; and three or more processors excluding the main processor from the u-pieces of processors, each of the three or more processors does not perform the first process in a period during which the main processor is performing the first process, and in the transport vehicle maintenance method, the three or more processors perform a plurality of types of maintenance processes for performing maintenance of the transport vehicle in a distributed manner in the period during which the main processor is performing the first process.

7. An onboard system provided at a transport vehicle that is elongated and travels along a previously provided route, the onboard system comprising u(where u is a natural number of 4 or greater)-pieces of processors, wherein each of the u-pieces of processors has a function of performing a first process for controlling the travel of the transport vehicle, the u-pieces of processors include:

a main processor being one processor that performs the first process; and three or more processors excluding the main processor from the u-pieces of processors, each of the three or more processors does not perform the first process in a period during which the main processor is performing the first process, and the three or more processors perform a plurality of types of maintenance processes for performing maintenance of the transport vehicle in a distributed manner in the period during which the main processor is performing the first process.

8. The onboard system according to claim 7, wherein each of the plurality of types of maintenance processes is a process of handling a plurality of types of data showing a state of the transport vehicle, with each of the plurality of types of data, a condition relating to the state of the transport vehicle and a priority used when the condition is satisfied are associated, and target data being one of the plurality of types of data is processed, when the condition associated with the target data is satisfied, according to the priority associated with the target data.

9. The onboard system according to claim 7, wherein the onboard system has a function of communicating with a ground system provided on a ground, the transport vehicle is formed by k(where k is a natural number of 2 or greater)-pieces of unit trains linearly coupled to each other, and the k-pieces of unit trains includes a first unit train and a second unit train coupled to each other, the onboard system further comprising:

a first controller provided at the first unit train; and a second controller provided at the second unit train, wherein the first controller retains state data representing a state of the second unit train, and the first controller transmits the state data to one of the ground system and the second controller when the coupling between the first unit train and the second unit train is released.

10. The onboard system according to claim 7, further comprising:

a first apparatus; and a second apparatus, wherein each of the first apparatus and the second apparatus has a function of performing one of the plurality of types of maintenance processes, each of the first apparatus and the second apparatus has, as an operation mode, a normal mode for performing a second process relating to the travel of the transport vehicle, and a standby mode where the performing the second process is not permitted, when the operation mode of the first apparatus is the normal mode, the operation mode of the second apparatus is the standby mode, when the operation mode of the second apparatus is the normal mode, the operation mode of the first apparatus is the standby mode, and one of the first apparatus and the second apparatus whose operation mode is the standby mode performs one of the plurality of types of maintenance processes.

11. The onboard system according to claim 10, wherein the onboard system switches, over the first apparatus and the second apparatus, between an apparatus to perform the second process and an apparatus to perform one of the plurality of types of maintenance processes.

* * * * *